(12) United States Patent
Abe

(10) Patent No.: US 9,772,441 B2
(45) Date of Patent: Sep. 26, 2017

(54) ILLUMINATION DEVICE AND DISPLAY UNIT

(71) Applicant: SATURN LICENSING LLC, New York, NY (US)

(72) Inventor: Yoshihiro Abe, Kanagawa (JP)

(73) Assignee: Saturn Licensing LLC, New York, NY (US)

( * ) Notice: Subject to any disclaimer, the term of this patent is extended or adjusted under 35 U.S.C. 154(b) by 75 days.

(21) Appl. No.: 14/176,427

(22) Filed: Feb. 10, 2014

(65) Prior Publication Data

US 2014/0240644 A1    Aug. 28, 2014

(30) Foreign Application Priority Data

Feb. 27, 2013 (JP) .................................. 2013-037225

(51) Int. Cl.
*G02F 1/1335* (2006.01)
*F21V 8/00* (2006.01)
*B82Y 20/00* (2011.01)

(52) U.S. Cl.
CPC ......... *G02B 6/0088* (2013.01); *G02B 6/0023* (2013.01); *G02B 6/0091* (2013.01); *B82Y 20/00* (2013.01); *Y10S 977/834* (2013.01)

(58) Field of Classification Search
CPC .. G02B 6/0088; G02B 6/0023; G02B 6/0091; F21V 14/00; F21V 14/08; F21K 9/58; B82Y 20/00; Y10S 977/834
USPC ...................................................... 349/58–67
See application file for complete search history.

(56) References Cited

U.S. PATENT DOCUMENTS

| 8,454,219 | B2* | 6/2013 | Byoun | G02B 6/0091 |
| | | | | 362/612 |
| 2010/0128465 | A1 | 5/2010 | Byoun et al. | |
| 2011/0090426 | A1* | 4/2011 | Choi | G02B 6/009 |
| | | | | 349/65 |
| 2011/0273642 | A1* | 11/2011 | Kweon | G02B 6/0083 |
| | | | | 349/62 |
| 2012/0188747 | A1* | 7/2012 | Mine | G02B 6/0068 |
| | | | | 362/97.1 |
| 2013/0050612 | A1* | 2/2013 | Hur | G02F 1/133603 |
| | | | | 349/62 |
| 2013/0336003 | A1* | 12/2013 | Yang | G02B 6/42 |
| | | | | 362/608 |
| 2015/0015798 | A1* | 1/2015 | Masuda | G02F 1/1333 |
| | | | | 348/794 |

FOREIGN PATENT DOCUMENTS

| CN | 102235621 A | 11/2011 |
| CN | 10233914 A | 1/2012 |
| CN | 102606960 A | 7/2012 |
| CN | 102798038 A | 11/2012 |
| JP | 2006-324407 A | 11/2006 |

OTHER PUBLICATIONS

Office Action issued in Chinese Application No. 201410057171.8 dated Apr. 26, 2017. With English translation (19 pages).

\* cited by examiner

*Primary Examiner* — Charles Chang
(74) *Attorney, Agent, or Firm* — Oblon, McClelland, Maier & Neustadt, L.L.P.

(57) ABSTRACT

An illumination device includes: a light source; an optical component provided separately from the light source; a holding member holding the light source and the optical component; and a variable pressing member variably pressing the optical component against the holding member.

17 Claims, 29 Drawing Sheets

ILLUMINATION DEVICE AND DISPLAY UNIT

CROSS REFERENCE TO RELATED APPLICATION(S)

This application claims the benefit of Japanese Priority Patent Application JP 2013-037225 filed Feb. 27, 2013, the entire contents of which are incorporated herein by reference.

BACKGROUND

The present disclosure relates to an illumination device suitable for a planar light source, and a display unit including the illumination device.

In recent years, along with reduction in thickness of a television monitor, a display unit including a combination of a liquid crystal panel and an illumination device (a backlight unit) has become a mainstream. Further, in addition to the thickness reduction, the display unit includes an edge light emitting diode (LED) type illumination device in which the number of LEDs occupying a large proportion of material cost is reduced.

In the edge LED type illumination device, LED light sources are arranged in one end of the illumination device, and a light guide plate is disposed over an entire region desired to emit light. Therefore, even if the LEDs are arranged only on the one end of the illumination device, the entire screen is allowed to be brightened. In addition, displacing an optical sheet between the light guide plate and the liquid crystal panel causes uniform light emission over the entire surface.

For example, in Japanese Unexamined Patent Application Publication No. 2006-324407, as an example of the LED light source, surroundings of a blue LED element is filled with a sealing resin, and the sealing resin contains a yellow fluorescent substance and a green fluorescent substance in a dispersed state to expand color gamut as compared with the color gamut of white obtained based on complementary color relation between blue and yellow.

SUMMARY

However, color developing characteristics of an existing illumination device is substantially determined depending on characteristics of an LED light source. Therefore, a technique of changing structure of a fluorescent substance in the sealing resin has a limit in improvement of color developing characteristics.

It is desirable to provide an illumination device capable of obtaining more favorable color developing characteristics, and a display unit including the illumination device.

According to an embodiment of the present disclosure, there is provided an illumination device including: a light source; an optical component provided separately from the light source; a holding member holding the light source and the optical component; and a variable pressing member variably pressing the optical component against the holding member.

In the illumination device according to the embodiment of the present disclosure, the optical component is provided separately from the light source. The optical component is held together with the light source by the holding member, and is variably pressed against the holding member by the variable pressing member. Therefore, when the tolerance of the optical component is large, or when a coefficient of thermal expansion of the optical component is different from that of the holding member, the optical component is held with high positional accuracy in the holding member. Accordingly, appropriate positional relationship between the light source and the optical component is maintained, and optical integrity is ensured even when the light source and the optical component are provided separately from each other, and thus property of the optical component is favorably exerted.

According to an embodiment of the present disclosure, there is provided a display unit provided with a liquid crystal panel and an illumination device provided on a back surface side of the liquid crystal panel. The illumination device includes: a light source; an optical component provided separately from the light source; a holding member holding the light source and the optical component; and a variable pressing member variably pressing the optical component against the holding member.

In the display unit according to the embodiment of the present disclosure, image display is performed by allowing light from the illumination device to selectively pass through the liquid crystal panel.

In the illumination device of the embodiment of the present disclosure or the display unit according to the embodiment of the present disclosure, the optical component is provided separately from the light source, the light source and the optical component are held by the holding member, and the variable pressing member that variably presses the optical component against the holding member is provided. Therefore, the optical component is held with high positional accuracy in the holding member, the property of the optical component is favorably exerted, and more favorable color developing characteristics are obtained without limitation by the characteristics of the light source.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Hereinafter, some embodiments of the present disclosure will be described in detail with reference to drawings. Note that description will be given in the following order:

1. First embodiment (an illumination device: an example of using a torsion coil spring as a variable pressing member)

2. Second embodiment (an illumination device: an example of using a U-shaped stopper as a variable pressing member)

3. Third embodiment (an illumination device: an example of using a torsion coil spring together with a stopper)

4. Fourth embodiment (an illumination device: an example of using an inverted U-shaped stopper as a variable pressing member)

5. Fifth embodiment (a display unit: a liquid crystal display unit)

6. Illumination apparatuses (application examples of an illumination device)

First Embodiment

Figure 1:
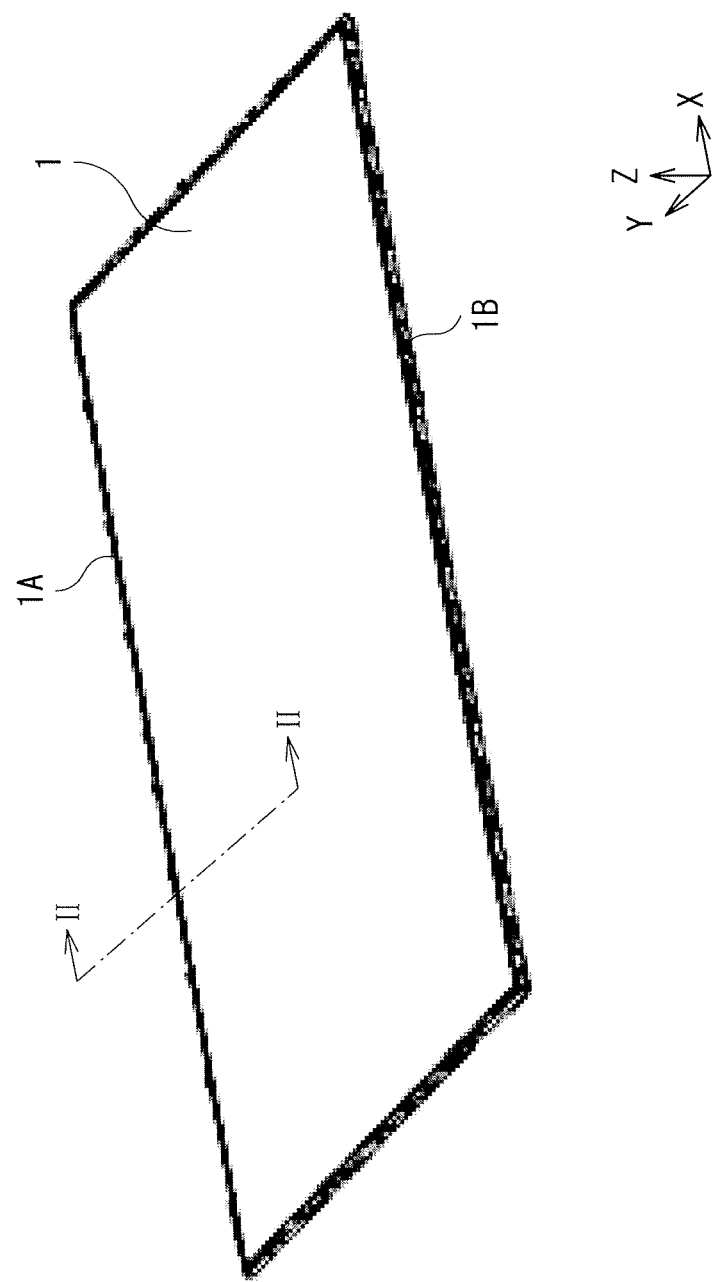
FIG. 1 is a perspective view illustrating an appearance of an illumination device according to a first embodiment of the present disclosure.

FIG. 1 illustrates an appearance of an illumination device 1 according to a first embodiment of the present disclosure. The illumination device 1 is used as a backlight illuminating a transmissive liquid crystal panel from a backside thereof, or as an illumination apparatus in a room or the like. The shape of the illumination device 1 is modified depending on a purpose, and for example, in a case of a liquid crystal television, the illumination device 1 may have a rectangular plate shape as illustrated in FIG. 1.

In the following description, a direction (a front-back direction) perpendicular to a main surface (a widest surface) of the illumination device 1 is referred to as Z direction, and a lateral direction (a long-side direction) and a vertical direction (a short-side direction) on the main surface of the illumination device 1 are referred to as X direction and Y direction, respectively.

Figure 2:
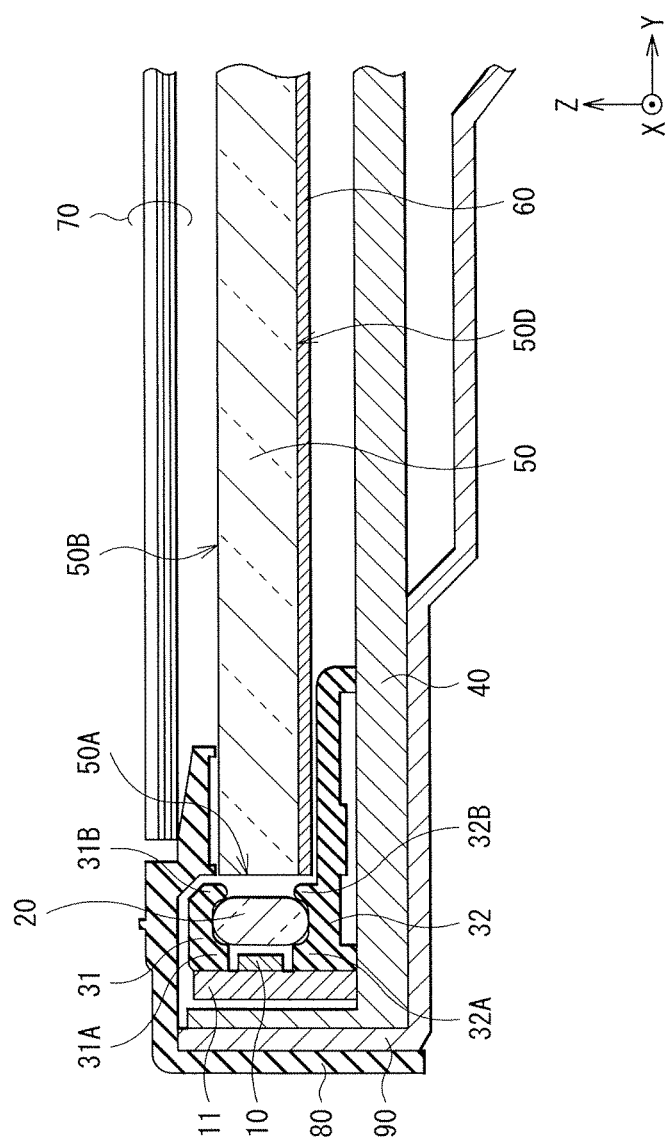
FIG. 2 is a sectional diagram illustrating the illumination device illustrated in FIG. 1 taken along II-II line.

FIG. 2 illustrates a sectional configuration of a top side 1A of the illumination device 1 illustrated in FIG. 1. For example, the illumination device 1 may include light sources 10, an optical component 20, a holding member 30, a heat dissipation member 40, a light guide plate 50, a reflective member 60, an optical sheet 70, a middle chassis 80, and a back chassis 90. Note that the light sources 10, the optical component 20, the holding member 30, and the heat dissipation member 40 may be disposed one or both of the top side 1A or a bottom side 1B. Alternatively, these components may be disposed one or both of right and left sides.

Figure 3:
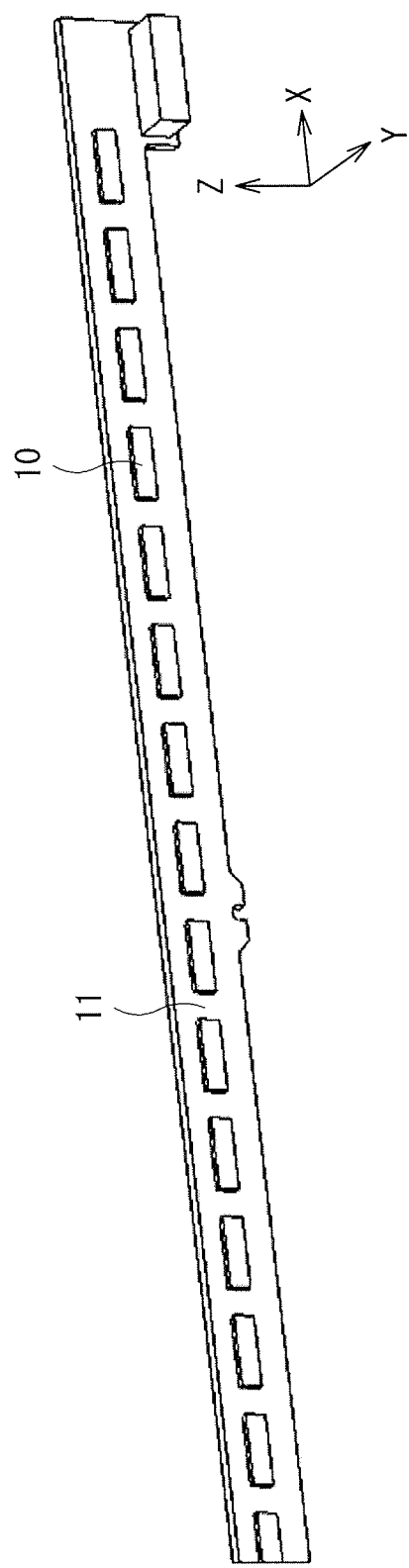
FIG. 3 is a perspective view illustrating a part of light sources illustrated in FIG. 2.

Each of the light sources 10 may be, for example, a point light source, and specifically, is configured of a light emitting diode (LED). For example, as illustrated in FIG. 3, the light sources 10 may be arranged in line on a light source substrate 11 that is formed of aluminum (Al). In other words, the plurality of light sources 10 as the point light sources is arranged side by side to configure a linear light source.

Figure 4:
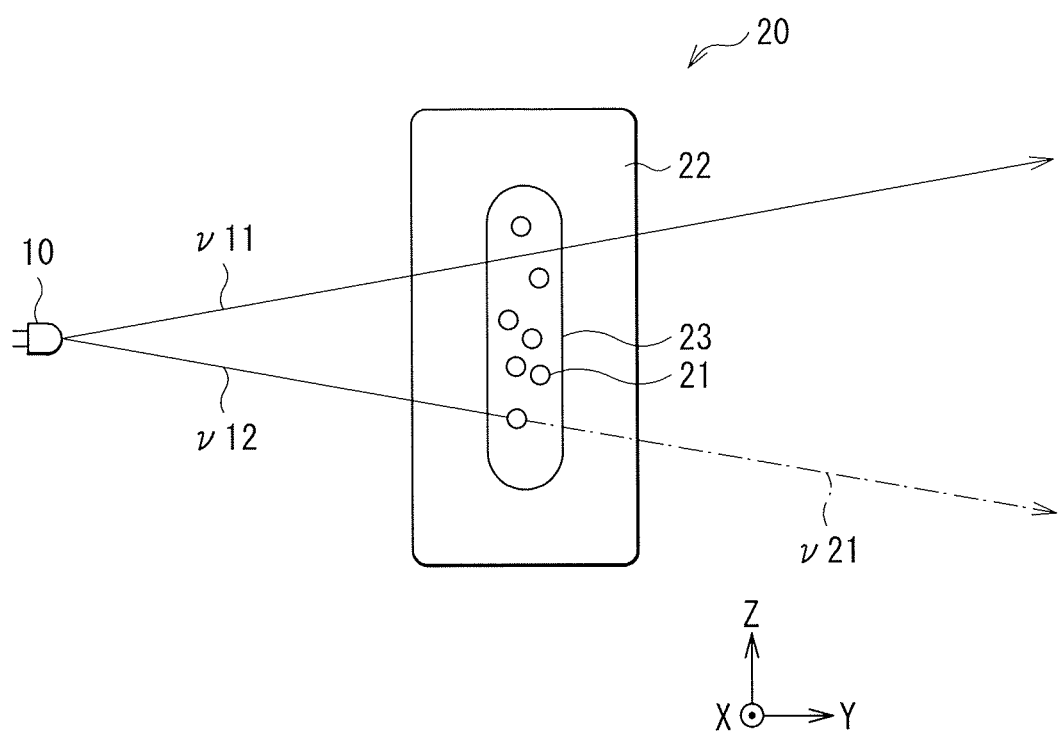
FIG. 4 is a sectional diagram illustrating a configuration of an optical component illustrated in FIG. 2.

The optical component 20 is disposed between the light sources 10 and the light guide plate 50 to improve color developing characteristics. Although the optical component 20 is provided separately from the light sources 10, the optical component 20 has a linear shape corresponding to the light sources 10. Specifically, the optical component 20 may be a wavelength conversion member in which a wavelength conversion material 21 is enclosed in a tubular container 22 as illustrated in FIG. 4, for example.

The wavelength conversion material 21 contains a fluorescent substance (a fluorescent material) such as a fluorescent pigment and a fluorescent dye, or a luminous body having a wavelength conversion function, such as a quantum dot. The wavelength conversion material 21 is excited by light v11 and v12 each having a first wavelength from the light source 10, and, based on the principle of fluorescence emission and the like, converts the wavelength of the light v11 and v12 having the first wavelength into a wavelength of light v21 having a wavelength (a second wavelength) different from the first wavelength to emit light. In FIG. 4, the light v11 and v12 each having the first wavelength are illustrated by solid lines, and the light v21 having the second wavelength is illustrated by an alternate long and short dash line.

The first wavelength and the second wavelength are not particularly limited, however, for example, in a case of being used in a display unit, the light v11 and v12 each having the first wavelength is blue light (for example, wavelength of about 440 nm to about 460 nm both inclusive), and the light v21 having the second wavelength is red light (for example, wavelength of about 620 nm to about 750 nm both inclusive) or green light (for example, wavelength of about 495 nm to 570 nm both inclusive). In other words, each of the light sources 10 is a blue light source, and the wavelength conversion material 21 converts the wavelength of the blue light to the wavelength of red light or green light.

The wavelength conversion material 21 may preferably contain a quantum dot. The quantum dot is a particle having a diameter of about 1 nm to about 100 nm both inclusive, and has a discrete energy level. The energy state of the quantum dot depends on the size thereof. Therefore, an emission wavelength is allowed to be freely selected by changing the size. In addition, a light beam emitted from the quantum dot has a narrow spectrum width. A color gamut is enlarged by combining such light beams each having a steep peak. Accordingly, using the quantum dot in the wavelength conversion material 21 enables enlargement of the color gamut with ease. Further, the quantum dot has high responsiveness, which makes it possible to efficiently use the light from the light sources 10. In addition, the quantum dot has high stability. For example, the quantum dot may be a compound of a group 12 element and a group 16 element, a compound of a group 13 element and a group 16 element, or a compound of a group 14 element and a group 16 element, and examples of the quantum dot may include CdSe, CdTe, ZnS, CdS, PdS, PbSe, and CdHgTe.

Incidentally, in FIG. 4, although the wavelength conversion material 21 is illustrated as a particle like a quantum dot for simplification, it is needless to say that the wavelength conversion material 21 is not limited to a particle.

The container 22 is a tubular container (a capillary) that contains and seals the wavelength conversion material 21 and is formed of a glass or the like. Providing the container 22 enables suppression in characteristic change of the wavelength conversion material 21 caused by moisture and oxygen in the air, and facilitates handling.

The container 22 has a rectangular parallelepiped shape (including a substantially rectangular parallelepiped shape having fine modification such as a rounded side), and is disposed so that one surface of the rectangular parallelepiped faces the light source 10. The container 22 has a cavity inside thereof. The cavity is a containing section 23 of the wavelength conversion material 21.

Note that the optical component 20 is allowed to be manufactured, for example, in the following way: a fluorescent material or quantum dots is/are kneaded with an ultraviolet curable resin; an obtained mixture is put in the container 22 such as a glass tube; a side of the container 22 is sealed; ultraviolet ray is irradiated to the mixture to cure the resin; and resinous wavelength conversion material 21 having viscosity of a certain degree is formed.

The holding member 30 is a holder to fix and hold the light sources 10 and the optical component 20 in a predetermined positional relationship. As illustrated in the sectional diagram of FIG. 2, the holding member 30 is configured of an upper surface section 31 and a bottom surface section 32 that are separated from each other, and the light generated by the light source 10 travels between the upper surface section 31 and the bottom surface section 32 in the Y direction. The upper surface section 31 and the bottom surface section 32 each extend in the direction (the X direction) same as the extending direction of the light sources 10 and the optical component 20 (the container 22). The distance (in the Z direction) between the upper surface section 31 and the bottom surface section 32 may be preferably equal to (or substantially equal to) the length of the major axis of the container 22.

Figure 5:
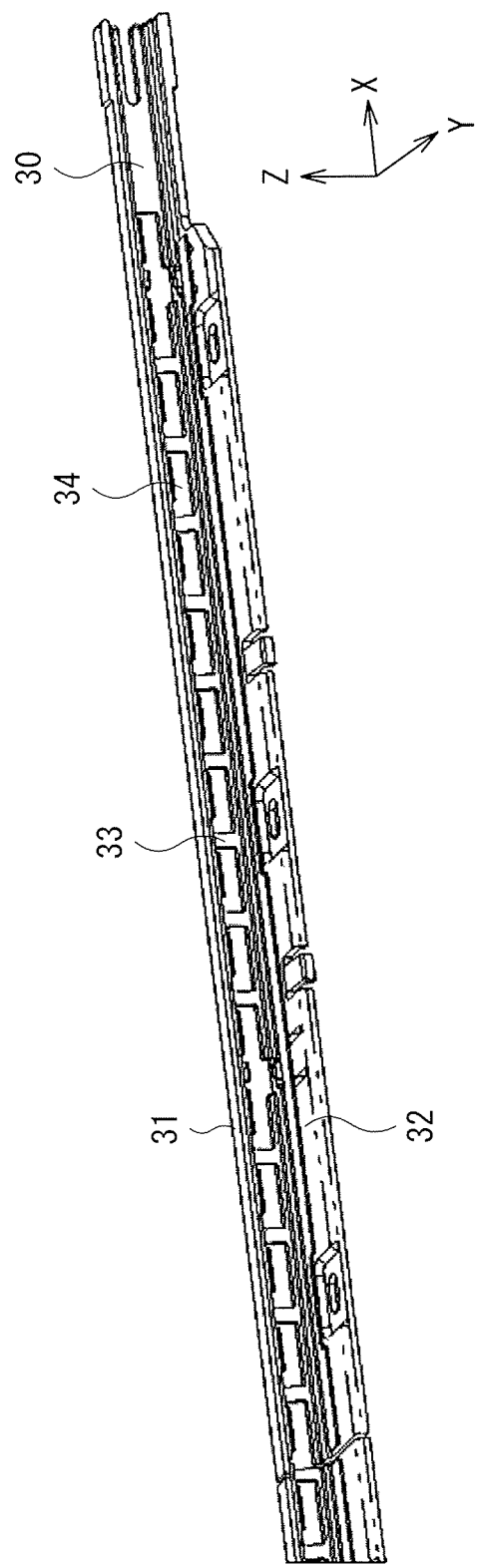
FIG. 5 is a perspective view illustrating a part of a holding member illustrated in FIG. 2.
Figure 6:
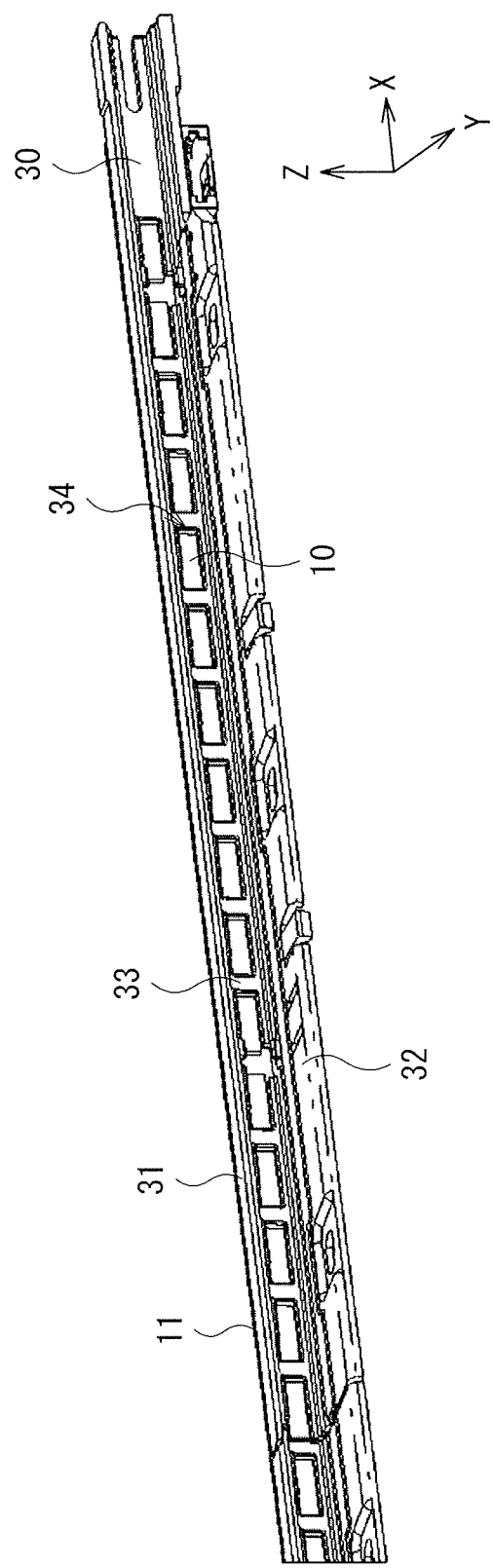
FIG. 6 is a perspective view illustrating a configuration in which the light sources are held by the holding member illustrated in FIG. 5.
Figure 7:
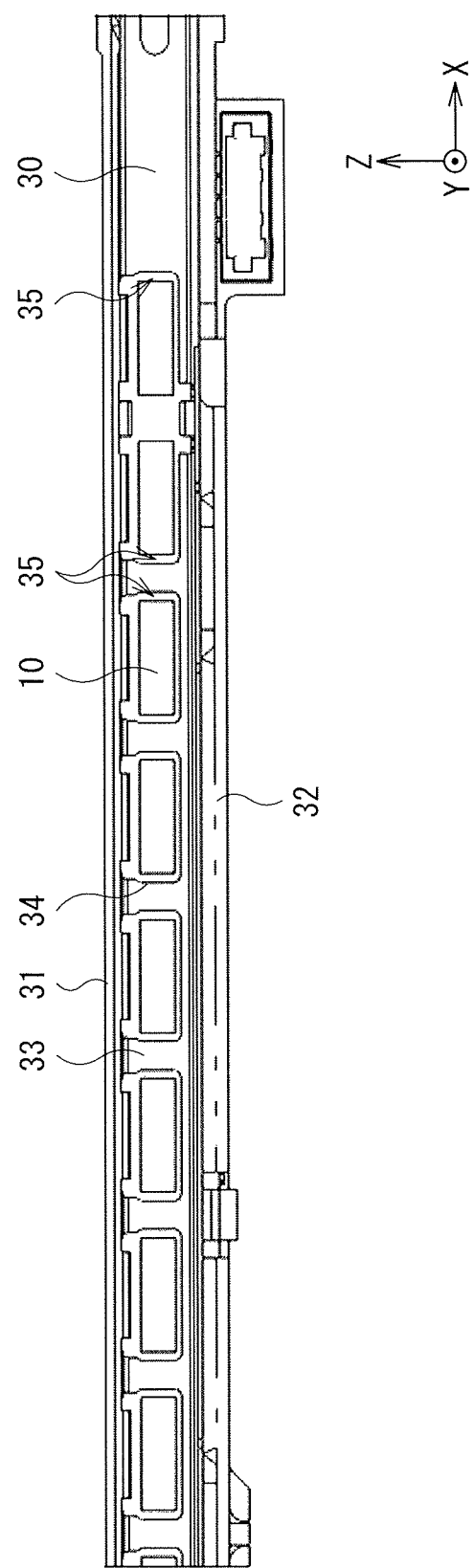
FIG. 7 is a front view illustrating a configuration of the holding member and the light sources illustrated in FIG. 6 as viewed from a side close to a light guide plate.

The upper surface section 31 and the bottom surface section 32 of the holding member 30 are coupled with each other by coupling sections 33 (not illustrated in FIG. 2, see FIG. 5), and are accordingly configured integrally. The positional relationship between the upper surface section 31 and the bottom surface section 32 of the holding member 30 is fixed by such coupling sections 33. As illustrated in FIG. 5, openings 34 are provided between respective adjacent coupling sections 33. As illustrated in FIG. 6, the light sources 10 are loosely inserted into the respective openings 34. Each of the openings 34 has a size larger than that of each of the light sources 10 so that a clearance 35 is generated between each of the openings 34 and each of the light sources 10 as illustrated in FIG. 7.

An upper first locking part 31A is provided on the light source 10 side of the upper surface section 31, and an upper second locking part 31B is provided on a side opposite thereto. A lower first locking part 32A is provided on the light source 10 side of the bottom surface section 32, and a lower second locking part 32B is provided on a side opposite thereto. A distance between the upper first locking part 31A and the upper second locking part 31B may be preferably equal to (or substantially equal to) the thickness (a size in the Y direction) of the container 22. Likewise, a distance between the lower first locking part 32A and the lower second locking part 32B may be preferably equal to (or substantially equal to) the thickness (a size in the Y direction) of the container 22.

The light source substrate 11 of the light sources 10 is fixed to the outside of the upper first locking part 31A and the lower first locking part 32A so that the light sources 10 are loosely fitted between the upper first locking part 31A and the lower first locking part 32A. Therefore, the upper first locking part 31A and the lower first locking part 32A also function as spacers intervening between the light sources 10 (the light source substrate 11) and the optical component 20 (the container 22). In other words, the light sources 10 (the light source substrate 11) and the optical component 20 (the container 22) are distanced from each other by an amount of the thickness (the size in the Y direction) of the upper first locking part 31A and the lower first locking part 32A.

Such a holding member 30 is formed of a highly reflective polycarbonate resin, a polyamide-based resin (for example, "Genestar (trade name)" manufactured by Kuraray Co., Ltd.).

The heat dissipation member 40 diffuses and dissipates heat generated by the light sources 10, and may be configured of, for example, an aluminum (Al) plate. The heat dissipation member 40 is provided from a backside of the light source substrate 11 to below the holding member 30 and the light guide plate 50, and has a disposing section (not illustrated) to dispose the bottom surface section 32 of the holding member 30.

The light guide plate 50 guides the light generated by the light sources 10 from a light incident surface 50A to a light emission surface 50B, and may contain a transparent thermoplastic resin such as a polycarbonate resin (PC) and an acrylic resin (for example, polymethyl methacrylate (PMMA)). For example, the light guide plate 50 may have a rectangular parallelepiped shape configured of a pair of main surfaces (a front surface and a bottom surface) and top, bottom, right, and left end surfaces (side surfaces). The main surfaces are opposed to each other in the front-back direction (the Z direction), and the four end surfaces are in contact with the main surfaces.

The top end surface and the bottom end surface of the light guide plate 50 are the light incident surfaces 50A receiving the light from the light sources 10 as described above. Note that the light incident surface 50A may be one of the top and bottom end surfaces of the light guide plate 50. In addition, the three end surfaces or all of the four end surfaces of the light guide plate 50 may be the light incident surfaces 50A.

The front surface of the light guide plate 50 is the light emission surface 50B allowing the light incident from the light incident surface 50A to be emitted. Each of the light emission surface 50B (the front surface) and the bottom surface of the light guide plate 50 may have, for example, a planar shape corresponding to an object to be illuminated (for example, a liquid crystal panel 222 described later) that is disposed on a side close to the light emission surface 50B of the light guide plate 50.

A pattern 51 (not illustrated in FIG. 2, see FIG. 18) having irregular reflection characteristics is printed on the bottom surface 50D of the light guide plate 50. The pattern 51 reflects, toward the light emission surface 50B of the light guide plate 50, the light that travels toward the bottom surface 50D of the light guide plate 50.

The reflective member 60 is a plate-like or sheet-like member provided on the bottom surface 50D side of the light guide plate 50. The reflective member returns, toward the light guide plate 50, light leaked from the light sources 10 to the bottom surface 50D side of the light guide plate 50 or light emitted from the inside of the light guide plate 50 to the bottom 50D side. For example, the reflective member 60 may have functions such as reflection, diffusion, and scattering, which enables efficient use of the light from the light source 10 to enhance a front luminance.

The reflective member 60 may be configured of, for example, foamed polyethylene terephthalate (PET), an evaporated silver film, a multilayer reflective film, or white PET. In the case where a function of regular reflection (mirror reflection) is provided to the reflective member 60, the surface of the reflective member 60 may be preferably subjected to treatment such as silver evaporation, aluminum evaporation, and multilayer film reflection. In the case where fine shape is added to the reflective member 60, the reflective member 60 may be integrally formed by techniques such as thermal press molding using a thermoplastic resin, and melt extrusion molding, or may be formed by applying an energy ray (for example, ultraviolet ray) curable resin on a base material formed of PET or the like, and then transferring the shape to the energy ray curable resin. In this case, examples of the thermoplastic resin may include an acrylic resin such as a polycarbonate resin and polymethyl methacrylate (PMMA) resin, a polyester resin such as polyethylene terephthalate, an amorphous copolymerized polyester resin such as a copolymer of methyl methacrylate and styrene (MS), a polystyrene resin, and a polyvinylchloride resin. In addition, in the case where the shape is transferred to an energy ray (for example, ultraviolet ray) curable resin, the base material may be glass.

The optical sheet 70 is provided on a side close to the light emission surface 50B (the front surface) of the light guide plate 50, and may include, for example, a diffuser plate, a diffuser sheet, a lens film, and a polarization separation sheet. Providing such an optical sheet 70 allows the light emitted from the light guide plate 50 in an oblique direction to rise up in the front direction, which enables further enhancement of the front luminance.

The middle chassis 80 is a frame-like resin component holding the optical sheet 70 and the liquid crystal panel 222 which will be described later. In addition, an end of the light guide plate 50 and an end of the reflective member 60 are sandwiched and held between an end of the middle chassis 80 and an end of the holding member 30. Note that it is sufficient for the holding member 30 to sandwich at least the upper end and the lower end of the container 22, and the end of the light guide plate 50 and the end of the reflective member 60 may be held by another member.

The back chassis 90 houses and holds the light sources 10 to the optical sheet 70, and is configured of a metallic plate formed of aluminum or the like.

Figure 8:
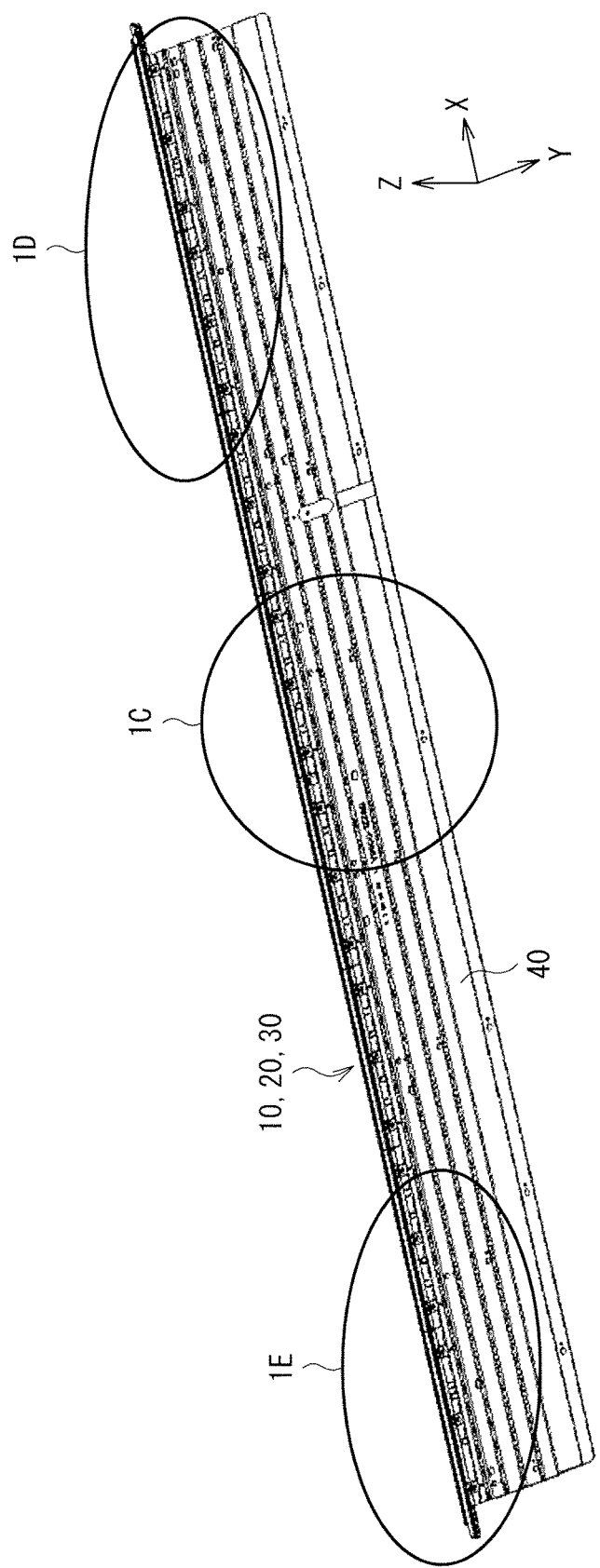
FIG. 8 is a perspective view illustrating an entire configuration of the light sources, the optical component, the holding member, and a heat dissipation member that are illustrated in FIG. 2.
Figure 9:
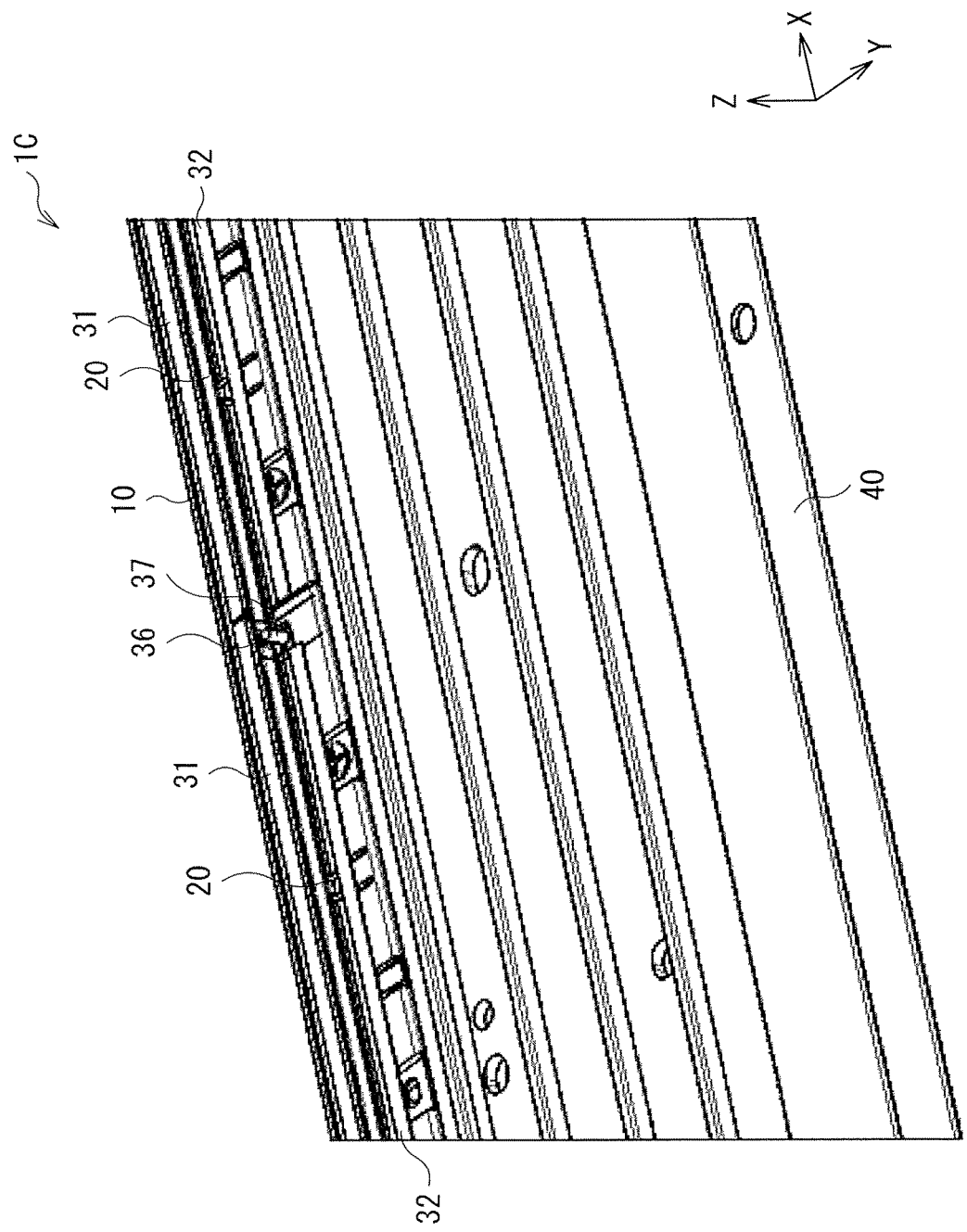
FIG. 9 is an enlarged perspective view illustrating a middle part of FIG. 8.

FIG. 8 illustrates an overall configuration of the light sources 10, the optical component 20, the holding member 30, and the heat dissipation member 40 that are illustrated in FIG. 2. FIG. 9 illustrates a middle part 1C of FIG. 8 in an enlarged manner. The optical components 20 includes a plurality of (for example, two) optical components 20, and the plurality of optical components 20 is arranged along a longitudinal direction (X direction) of the optical components 20 so that ends in the longitudinal direction of the respective optical components 20 are abutted on one another. The configuration in which the optical components 20 includes the plurality of optical components 20 is suitable for a case where it is difficult to fabricate the optical component 20 covering the entire top side 1A (or the entire bottom side 1B) in the illumination device 1 having a large area.

Figure 10:
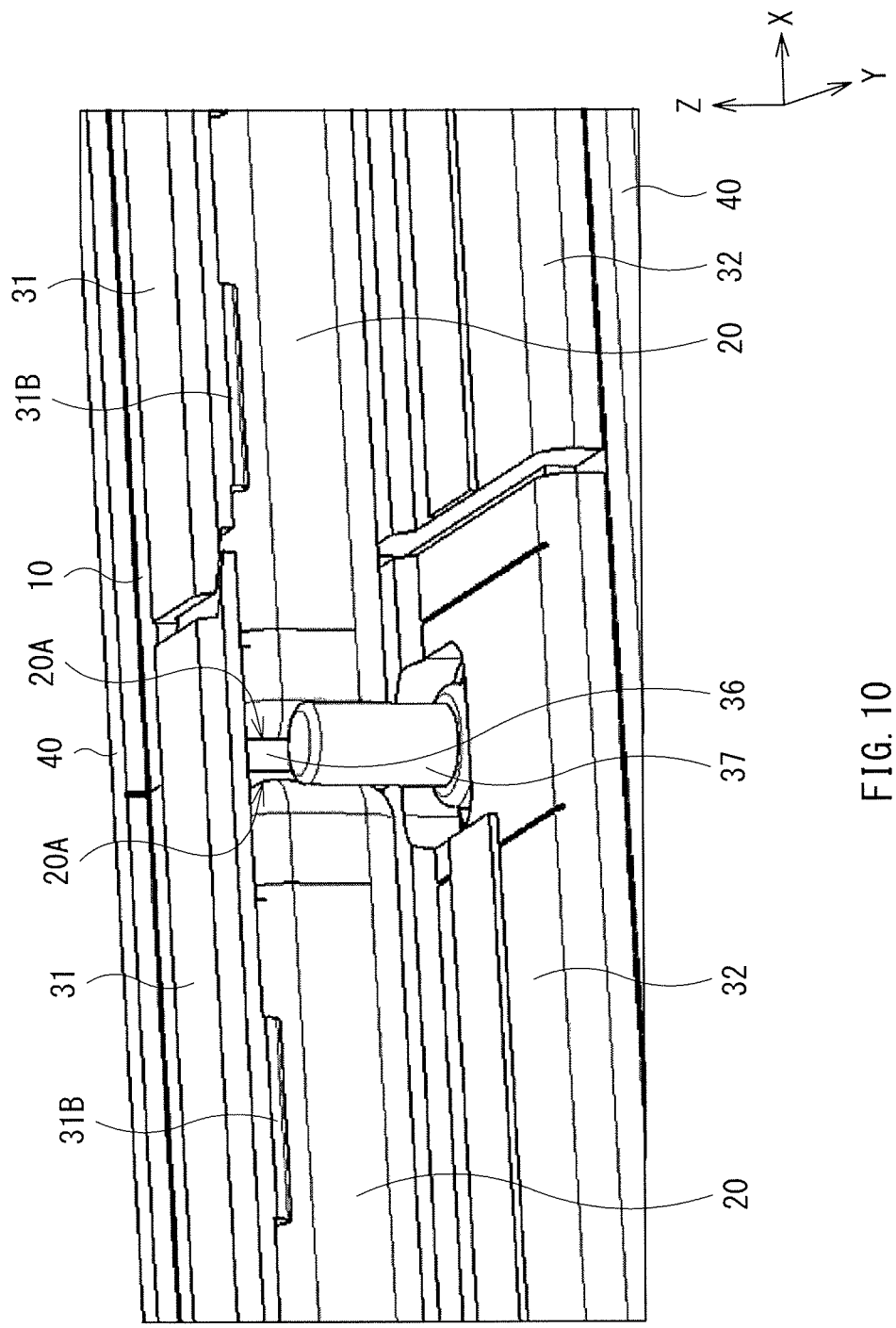
FIG. 10 is an enlarged perspective view illustrating a boundary between two adjacent containers illustrated in FIG. 9.
Figure 11:
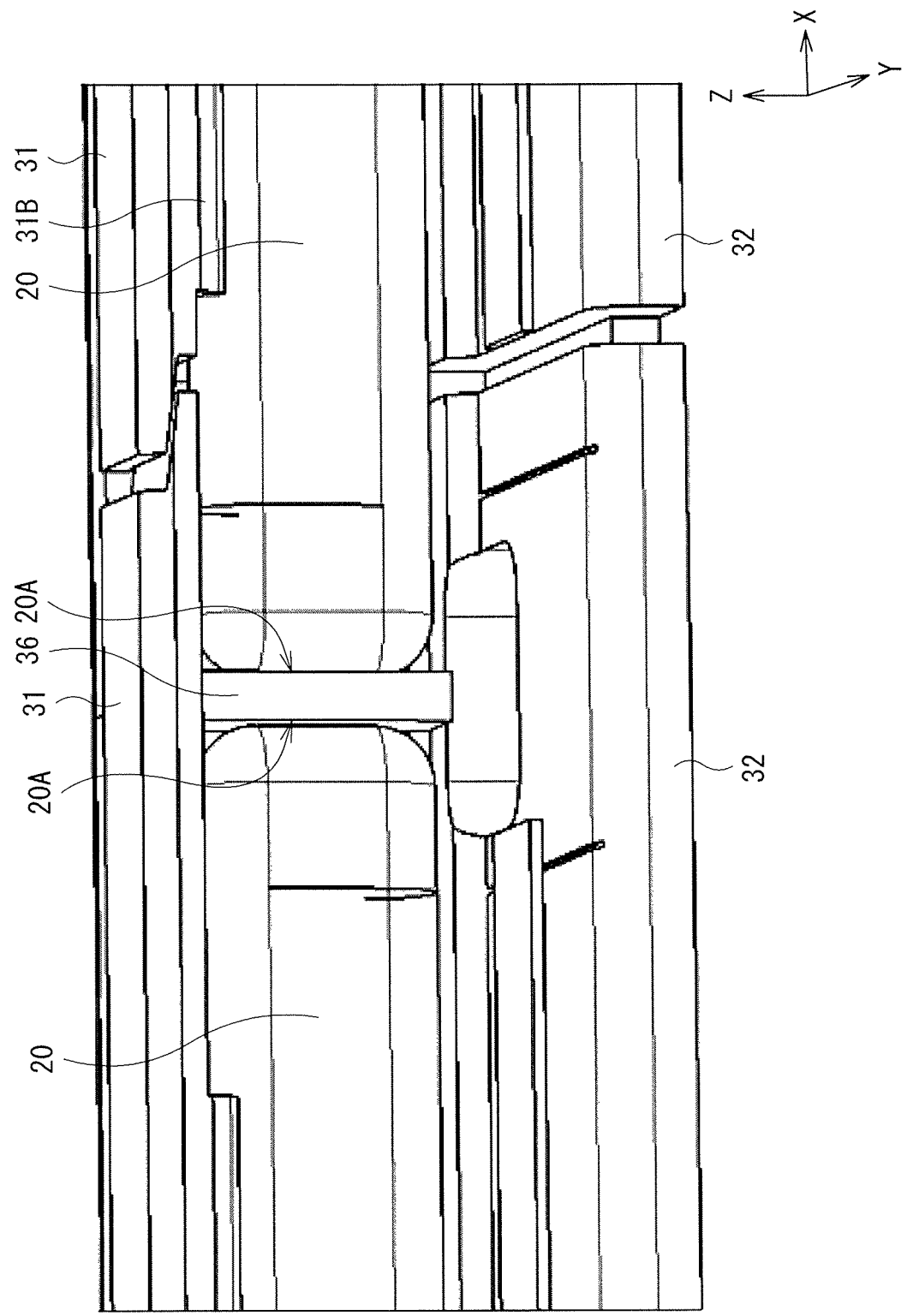
FIG. 11 is an enlarged perspective view illustrating a wall illustrated in FIG. 10.

FIG. 10 illustrates a boundary between two adjacent containers 22 of the optical components 20 illustrated in FIG. 9 in an enlarged manner. The holding member 30 has a wall 36 at a boundary between the two adjacent optical components 20. The wall 36 is a partition wall between the two adjacent optical components 20, and as illustrated in FIG. 11 in an enlarged manner, first ends 20A in the longitudinal direction of the respective two optical components 20 are in contact with both side surfaces of the wall 36.

In addition, as illustrated in FIG. 10, a pillar 37 may be provided near the wall 36. The pillar 37 receives the light incident surface 50A of the light guide plate 50 (see FIG. 2) to avoid damage of the container 22 due to contact of the light guide plate 50 and the optical component 20.

Figure 12:
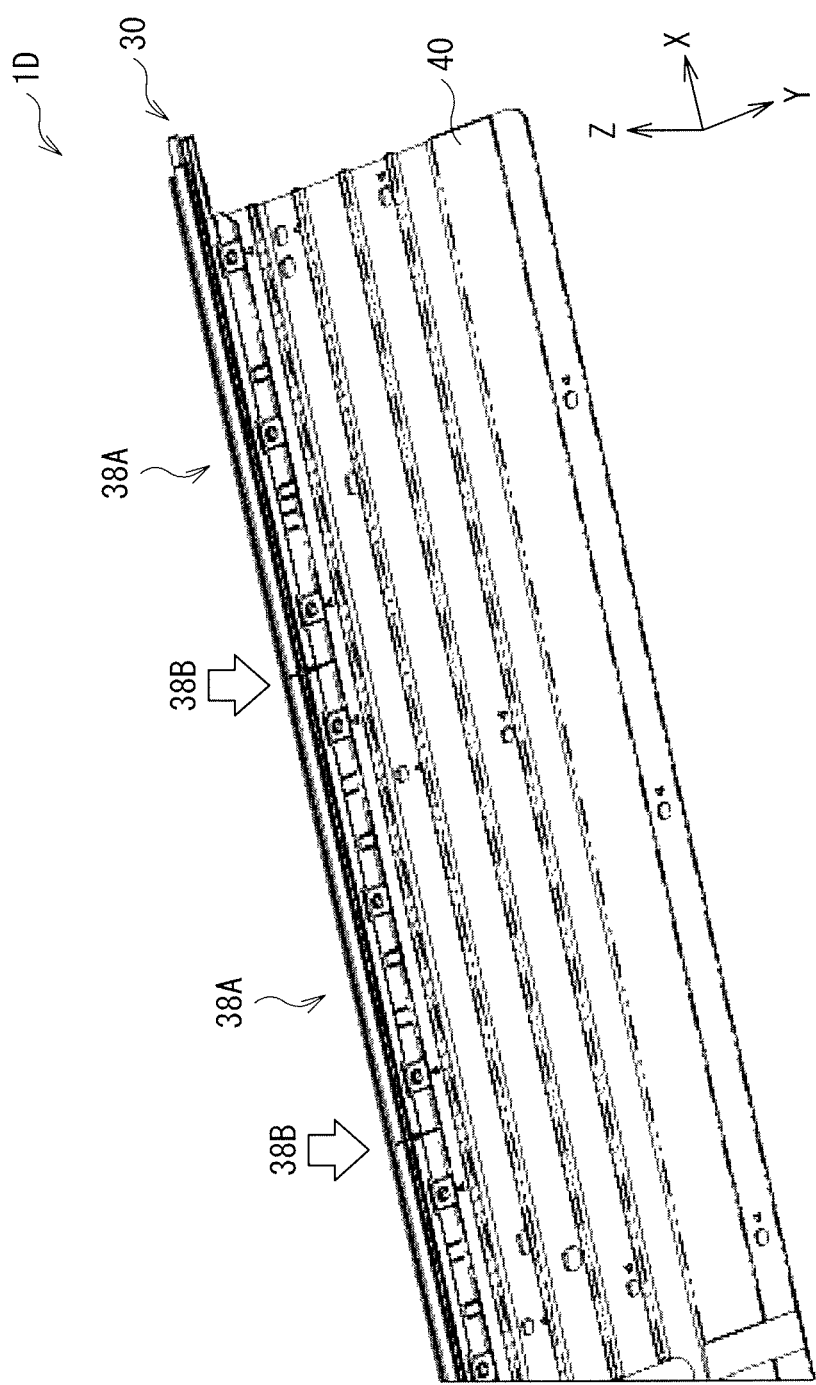
FIG. 12 is an enlarged perspective view illustrating a right end part of FIG. 8.

FIG. 12 illustrates a right end part 1D of FIG. 8 in an enlarged manner. The holding member 30 may be preferably divided into a plurality of divided holding members in the longitudinal direction (X direction) of the optical component 20. Such a configuration makes it possible to suppress contact of the holding member 30 and the light source 10 due to difference in coefficient of thermal expansion between the aluminum light source substrate 11 and the resin holding member 30.

Specifically, as illustrated in FIG. 7, the clearance 35 is provided between each of the openings 34 and each of the light sources 10. The clearance 35 may preferably have a size as small as possible because the use efficiency of the light from the light sources 10 is more enhanced. However, it is difficult to eliminate the clearance 35 because there are tolerances of respective components and differences in coefficients of the thermal expansion between the components. Since the holding member 30 is more extended or more shrunk as compared with the light sources 10 depending on the temperature, if the clearance 35 corresponding to the difference therebetween is not provided, the holding member 30 may contact with the light sources 10. Further, effects such as heat are increased as the dimension in the longitudinal direction (the X direction) of each of the components is larger. Therefore, the holding member 30 having a large coefficient of thermal expansion is divided into the plurality of divided holding members in the longitudinal direction (the X direction) of the optical component 20 so that the clearance 35 is allowed to be decreased in size and effect such as heat is allowed to be suppressed.

Figure 13:
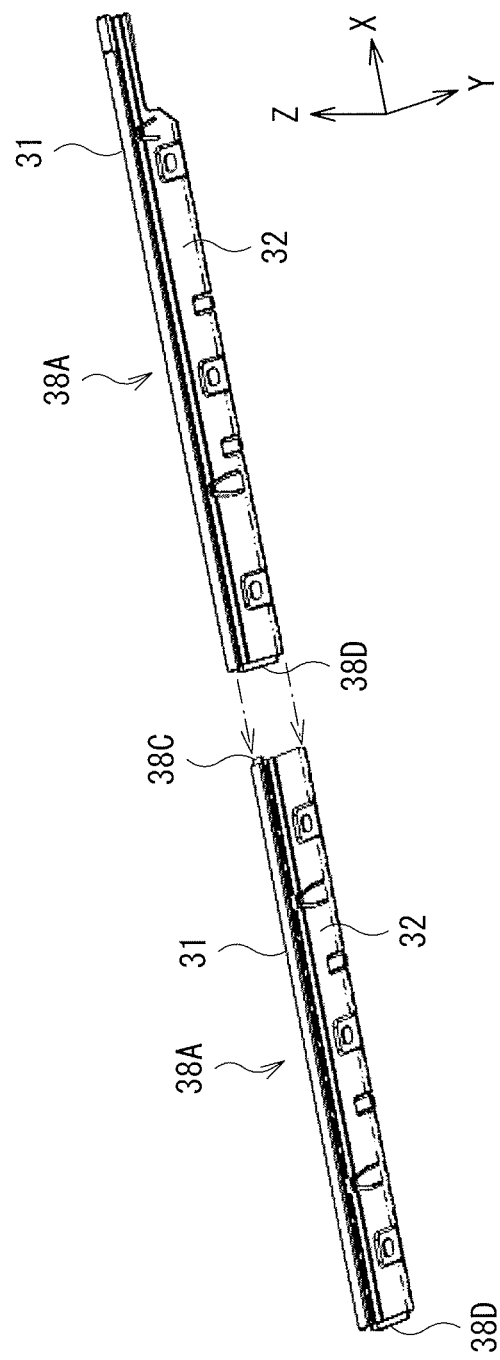
FIG. 13 is an exploded perspective view illustrating holding members illustrated in FIG. 12.

Specifically, the holding member 30 is divided into a plurality of divided holding members 38A, and the plurality of divided holding members 38A is joined with one another at dividing parts 38B. For example, as illustrated in FIG. 13, each of the plurality of divided holding members 38A has a projection 38C on a first end of the top surface section 31, and a step part (not illustrated) corresponding to the projection 38C on a second end of the top surface section 31. In addition, each of the plurality of divided holding members 38A has a projection 38D on a second end of the bottom surface section 32, and a step part (not illustrated) corresponding to the projection 38D on a first end of the bottom surface section 32. The plurality of divided holding members 38A is coupled with one another by overlapping the step parts and the corresponding projections 38C and 38D. Note that the holding member 30 may be divided into, for example, four divided holding members 38A with respect to one optical component 20, namely, eight divided holding members 38A as a total, however, the divided number is not limited thereto.

Figure 14:
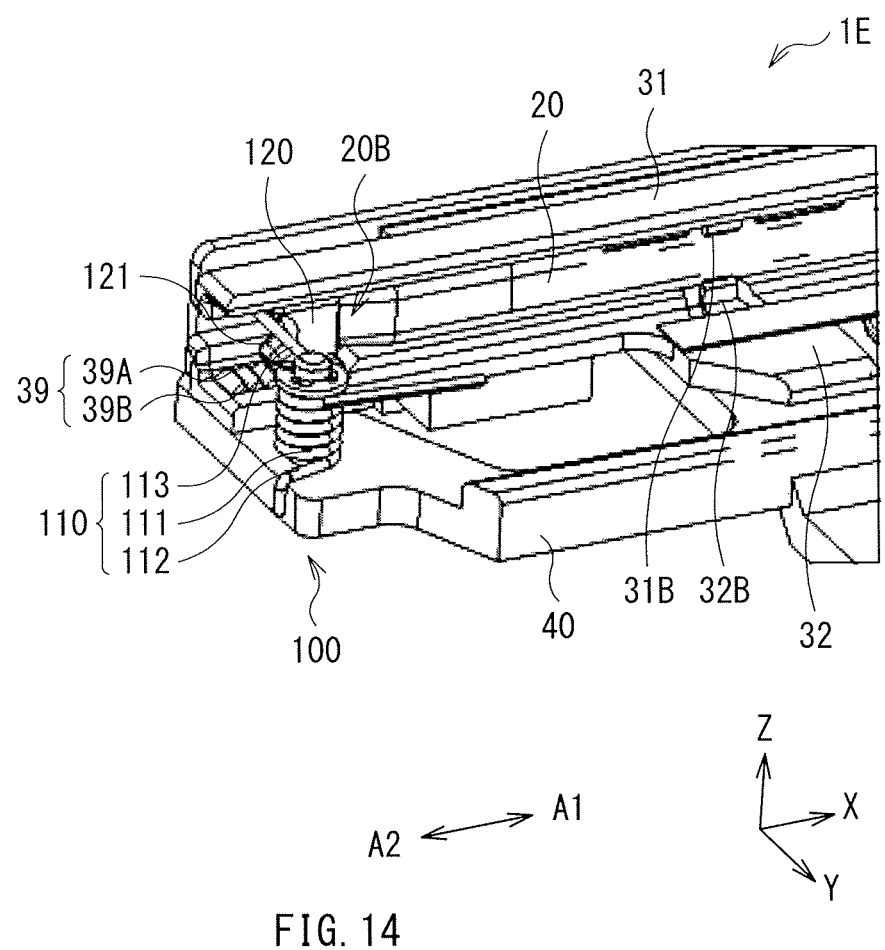
FIG. 14 is an enlarged perspective view illustrating a left end part of FIG. 8.

FIG. 14 illustrates a left end part 1E of FIG. 8 in an enlarged manner. The illumination device 1 has a variable pressing member 100 variably pressing the optical component 20 against the holding member 30. Therefore, the illumination device 1 is capable of obtaining more favorable color developing characteristics.

Specifically, the optical component 20 is provided to improve the color developing characteristics as described above. On the other hand, the use efficiency of the light from the light sources 10 is increased as the distance between the light sources 10 and the light guide plate 50 is shorter. Therefore, to dispose the optical component 20 between the light sources 10 and the light guide plate 50, it is desirable to hold the optical component 20 with high accuracy in a narrow space. However, in the case where the tolerance of the optical component 20 is large and the length thereof in the longitudinal direction (the X direction) is varied, or in the case where the coefficient of thermal expansion of the optical component 20 is different from that of the holding member 30, it is difficult to hold the optical component 20 constantly at the same position.

When the tolerance of the optical component 20 is large and the length thereof in the longitudinal direction (the X direction) is varied, or when the length of the optical component 20 is fluctuated due to thermal expansion, the variable pressing member 100 absorbs the variation and the fluctuation to hold the optical component 20 with high positional accuracy in the holding member 30. Accordingly, appropriate positional relationship between the light sources 10 and the optical component 20 is maintained, optical integrity is ensured even when the light sources 10 and the optical component 20 are provided separately from each other, which makes it possible to favorably exert the property of the optical component 20.

Further, in particular when the optical component 20 includes the two optical components 20, the variable pressing members 100 press the respective optical components 20 against the wall 36, which makes it possible to suppress that brightness and the like at the boundary between the two optical components 20 are different from those of its surroundings. Therefore, color developing characteristics with little unevenness are obtainable. In addition, it is possible to absorb the variation and the fluctuation in dimensions of the optical component 20, and it is possible to constantly press the optical component 20 against the wall 36. Accordingly, it is possible to prevent the first end 20A in the longitudinal direction of the optical component 20 from departing from the wall 36, and to improve continuity and integrity of the two optical components 20 in the longitudinal direction (the X direction).

More specifically, the variable pressing member 100 may be preferably an elastic component capable of pressing the optical component 20 in a first direction A1 (in a direction approaching the wall 36) in the holding member 30. The elastic component may be preferably formed of one or more of a metal spring, a resin, a foamed product, and elastomer. Examples of the metal spring may include a torsion coil spring, a coil spring, and a plate spring. Among them, the torsion coil spring may be preferable because the torsion coil spring provides stable load within a function range in a small space. The coil spring may desirably have a large space in the longitudinal direction (the X direction) in order to provide similar load between when the optical component 20 has a maximum length in tolerance and when the optical component 20 has a minimum length in tolerance. Likewise, the plate spring may desirably have a large space in the Y direction. The torsion coil spring has intermediate characteristics between the coil spring and the plate spring, and is capable of reducing the dimensions in the XYZ direction with best balance in a usable space. Examples of the resin may include polyacetal (POM). Examples of the foamed product may include urethane foam. The elastomer includes rubber and rubbery elastic industrial materials. Specific example of the rubber may include chloroprene rubber (CR rubber).

Further, the elastic component may be preferably formed of a metal spring, for example, a torsion coil spring 110 and a non-metal optical component cover provided between the metal spring and the optical component 20, for example, a cap 120. The torsion coil spring 110 and the cap 120 correspond to a specific example of "variable pressing member" in the present disclosure.

The torsion coil spring 110 has a first arm 112 and a second arm 113 at both ends of a coil section 111. For example, the coil section 111 may be mounted on the heat dissipation member 40, but may be disposed on the bottom surface section 32 of the holding member 30 or on the back chassis 90. The first arm 112 is folded as well as locked and fixed to the heat dissipation member 40. The second arm 113 pressurizes the optical component 20 in the first direction A1 through the cap 120.

Figure 15:
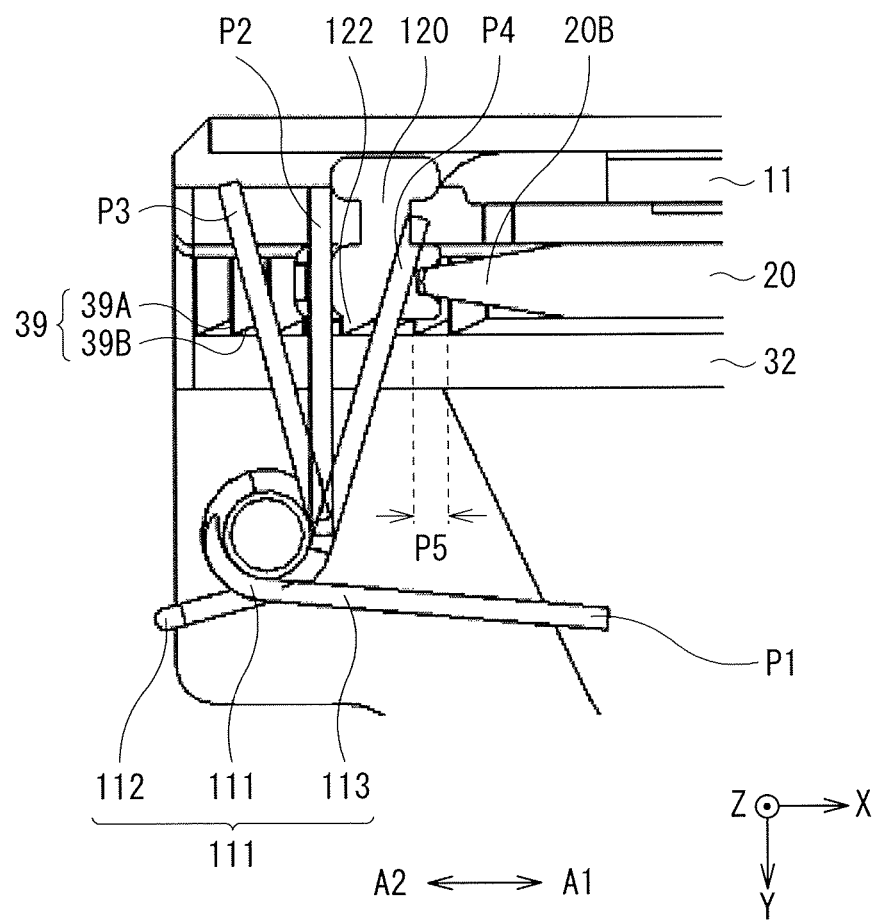
FIG. 15 is a plan view for describing operation of a torsion coil spring illustrated in FIG. 14.

FIG. 15 illustrates the vicinity of the torsion coil spring 110 and the cap 120 illustrated in FIG. 14, in an enlarged manner. For example, the second arm 113 of the torsion coil spring 110 may operate from a no-load position P1 in a winding direction, and is allowed to be reciprocated between a plus position P3 and a minus position P4 with reference to a center position P2, according to the tolerance, thermal expansion, and shrinkage of the optical component 20.

A first end of the cap 120 covers a second end 20B in the longitudinal direction of the optical component 20, and a second end of the cap 120 is provided with a concave part 121 that receives the second arm 113 of the torsion coil spring 110.

Moreover, the cap 120 engages with the holding member 30 in a movable state in the first direction A1. More specifically, a sawtooth section 39 is provided on the bottom surface section 32 of the holding member 30. The sawtooth section 39 has a latch structure in which a plurality of grooves 39B is arranged in the first direction A1 with ridges 39A in between. Each of the ridges 39A has a cross section of a right triangle formed of a perpendicular plane and an inclined plane inclined upward (becoming gradually higher) along the first direction A1. On the other hand, the cap 120 has a claw 122 (see FIG. 15) outside thereof. The claw 122 has a cross section of a right triangle formed of a perpendicular plane and an inclined plane inclined downward (becoming gradually lower) from a front end of the perpendicular plane along the first direction A1. The perpendicular plane of the claw 122 is locked with the perpendicular plane of the ridge 39A by engagement of the claw 122 and the groove 39B so that the cap 120 is regulated in position, and the claw 122 climbs over the ridge 39A and engages with the groove 39B adjacent to the ridge 39A so that the cap 120 is movable in the first direction A1.

Since the cap 120 moves in stages on the sawtooth section 39, the position of the cap 120 changes discretely according to the pitch P5 of the ridges 39A and the grooves 39B. When the pitch P5 of the ridges 39A and the grooves 39B is coarse, the grooves 39B are allowed to be deeper to increase holding power for the claw 122. In contrast, when the pitch P5 is dense, the positional accuracy of the cap 120 is allowed to be enhanced. Therefore, the cycle (pitch) P5 of the ridges 39A and the grooves 39B is set within an optically correctable range through adjustment of the positional density of the pattern 51, or the like.

In addition, by using the torsion coil spring 110 together with the cap 120, fine adjustment is allowed to be performed by reciprocation of the torsion coil spring 110 after rough positioning of the optical component 20 by engagement of the cap 120 and the sawtooth section 39. Accordingly, the operation range of the torsion coil spring 110 is allowed to be narrowed, which makes design of the torsion coil spring 110 easy.

The above-described configuration is symmetrical about the wall 36 in the lateral direction (the X direction). In other words, although not illustrated, the variable pressing member 100 configured of the torsion coil spring 110 and the cap 120 is provided at the second end 20B of the optical component 20 on the opposite right end part 1D. Thus, the two optical components 20 are constantly pressed against the center wall 36, which suppresses that the brightness and the like at the boundary between the two optical components 20 are different from those of its surroundings.

Figure 16:
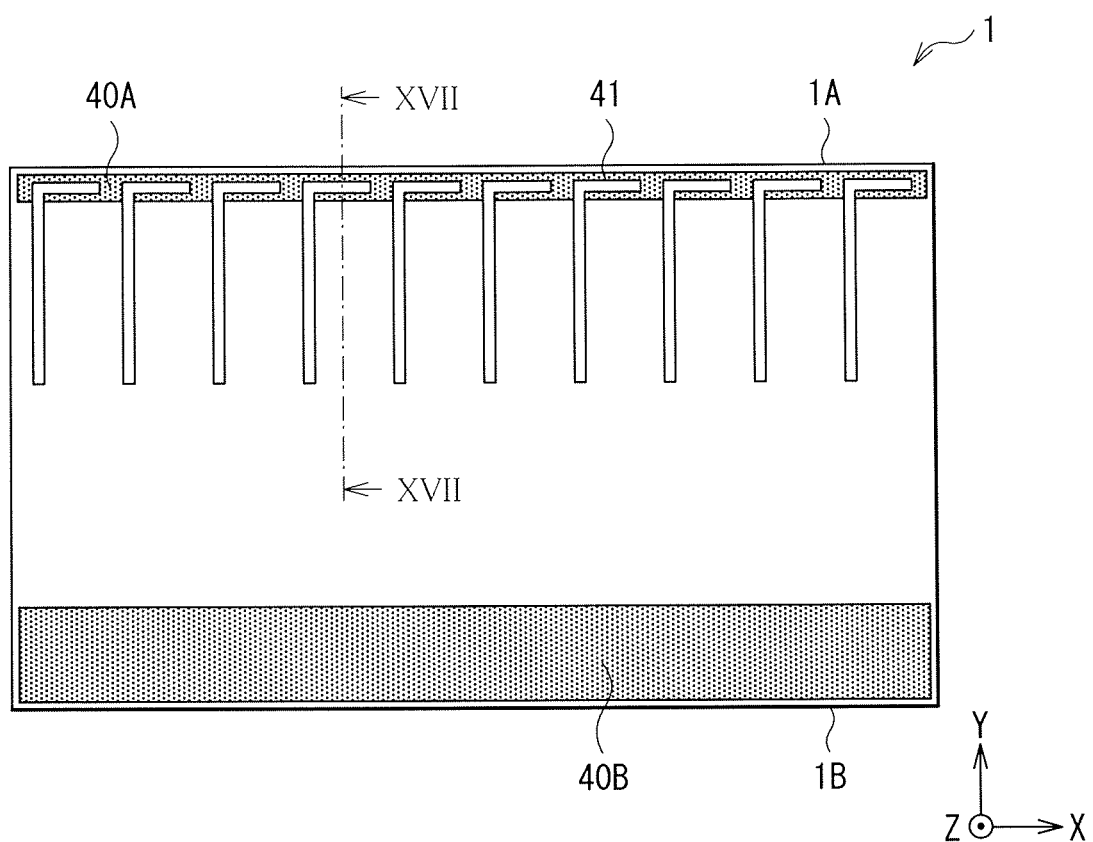
FIG. 16 is a plan view of the illumination device illustrated in FIG. 1.
Figure 17:
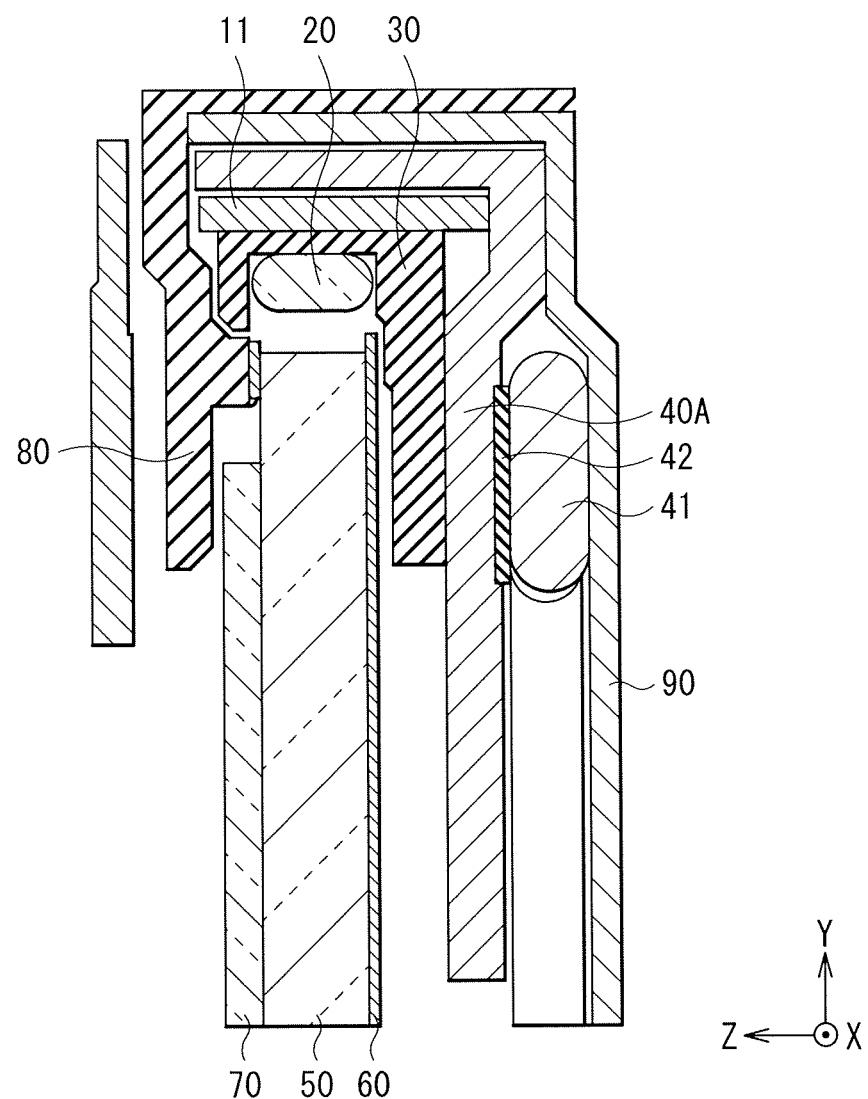
FIG. 17 is a sectional diagram taken along XVII-XVII line in FIG. 16.

FIG. 16 illustrates a planar configuration of the illumination device 1, and FIG. 17 illustrates a sectional configuration taken along XVII-XVII line of FIG. 16. In the case where the light sources 10, the optical component 20, the holding member 30, and the heat dissipation member 40 are provided on both of the top side 1A and the bottom side 1B, a heat dissipation member 40B of the bottom side 1B may preferably have a width larger than that of a heat dissipation member 40A of the top side 1A. In addition, heat pipes 41 may be preferably provided on the top side 1A in addition to the narrow heat dissipation member 40A.

Specifically, in the case where the light sources 10 are disposed on both of the top side 1A and the bottom side 1B, there is a tendency that the top side 1A is more disadvantageous in heat dissipation than the top side 1B, and when the heat dissipation member 40A of the top side 1A is increased in size, the cost and the weight thereof may be increased. When the narrow heat dissipation member 40A and the heat pipes 41 are provided on the top side 1A, and an optimal heat dissipation structure is applied according to a temperature distribution, it is possible to obtain advantages such as temperature reduction of the light sources 10, cost reduction, and weight reduction.

The plurality of heat pipes 41 is provided and is arranged side by side along the top side 1A in the lateral direction (the X direction). For example, each of the heat pipes 41 may have an inverted-L-shaped planar shape configured of a short leg part 41A and a long leg part 41B. The short leg part 41A extends in the lateral direction (the X direction), and the long leg part 41B extends in the vertical direction (the Y direction). A heat conductive grease 42 is provided between each of the heat pipes 41 and the narrow heat dissipation member 40A.

Figure 18:
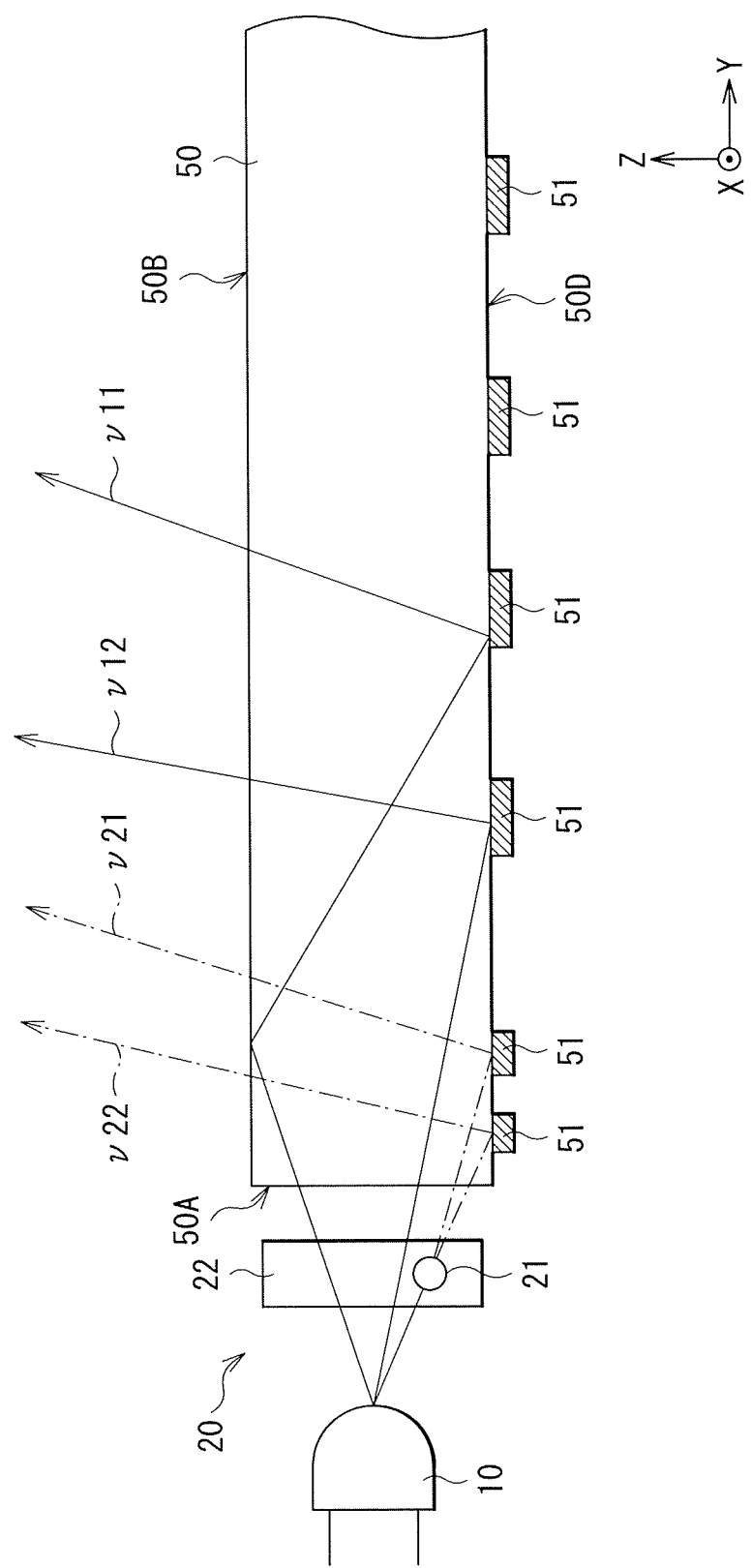
FIG. 18 is a diagram for describing a function of the illumination device illustrated in FIG. 1.

As illustrated in FIG. 18, in the illumination device 1, when the light source 10 generates the light v11 and v12 each having the first wavelength, the light v11 and v12 enter the container 22 and travel toward the wavelength conversion material 21. The light v11 and v12 that have entered the container 22 but have not collided with the wavelength conversion material 21 pass through the container 22 and then enter the light guide plate 50. Since the pattern 51 having irregular reflection characteristics is provided on the bottom surface 50D of the light guide plate 50, the light v12 is reflected by the pattern 51, travels toward the upper side of the light guide plate 50, and then is emitted from the light emission surface 50B. The light v11 is totally reflected by the light emission surface 50B of the light guide plate 50 before reaching the pattern 51, travels toward the bottom surface 50D, and is reflected by the pattern 51 and then emitted from the light emission surface 50B. These emitted light beams pass through the optical sheet 70 to be observed as light emission.

On the other hand, light v13 that has entered the container 22 and has collided with the wavelength conversion material 21 is converted in wavelength by the wavelength conversion material 21, and thus becomes light v21 and v22 each having a second wavelength λ2. The light v21 and v22 pass through the container 22, enter the light incident surface 50A of the light guide plate 50, are reflected by the pattern 51, and are then emitted from the light emission surface 50B. These emitted light beams pass through the optical sheet 70 to be observed as light emission.

In this case, the optical component 20 is provided separately from the light sources 10. The optical component 20 is held together with the light sources 10 by the holding member 30, as well as is variably pressed against the holding member 30 by the variable pressing member 100, that is, the cap 120 and the torsion coil spring 120. Accordingly, in the case where the tolerance of the optical component 20 is large and the length in the longitudinal direction (the X direction) thereof is varied, or in the case where the length of the optical component 20 is fluctuated due to thermal expansion, the variation and the fluctuation are absorbed. Thus, the optical component 20 is held in the holding member 30 with high positional accuracy. Consequently, appropriate positional relationship between the light sources 10 and the optical component 20 is maintained, optical integrity is ensured even when the light sources 10 and the optical component 20 are provided separately from each other, and thus the property of the optical component 20 is favorably exerted.

Furthermore, in particular when the optical component 20 includes the two optical components 20, pressing the optical components 20 against the wall 36 by the variable pressing members 100 suppresses that the brightness and the like at the boundary between the two optical components 20 are different from those of its surroundings. Therefore, it is possible to obtain color developing characteristics with little unevenness. Moreover, the variation and the fluctuation in dimensions of the optical component 20 are absorbed, and the optical components 20 are constantly pressed against the wall 36. Therefore, the first end 20A in the longitudinal direction of the optical component 20 is prevented from being distanced from the wall 36, which improves continuity and integrity of the two optical components 20 in the longitudinal direction (the X direction).

Note that the density distribution of the pattern 51 is increased near the boundary between the two optical components 20 so that variation in brightness at the boundary between the two optical components 20 is further decreased as described above.

As described above, in the first embodiment, the optical component 20 is provided separately from the light sources 10, the light sources 10 and the optical component 20 are held by the holding member 30, and the variable pressing member 100 variably pressing the optical component 20 against the holding member 30 is provided. Therefore, the optical component 20 is held in the holding member 30 with high positional accuracy, the property of the optical component 20 is favorably exerted, and more favorable color developing characteristics are obtainable without limitation by the characteristics of the light sources 10.

Second Embodiment

Figure 19:
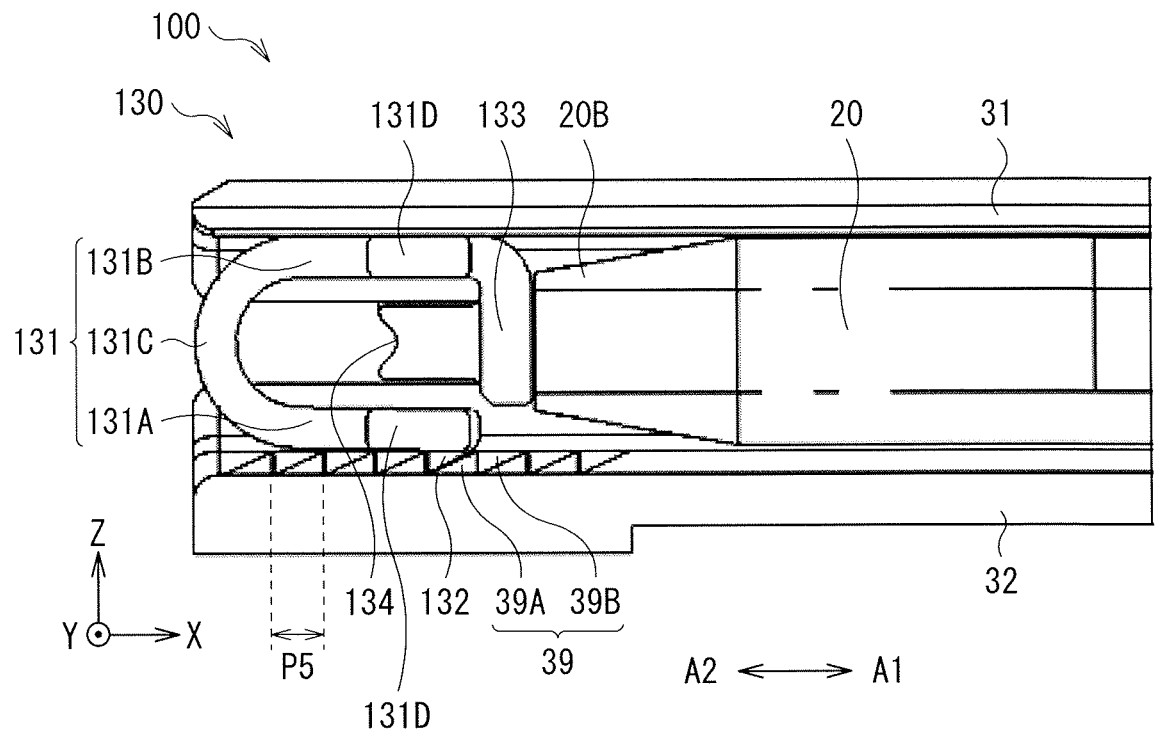
FIG. 19 is an enlarged front view illustrating a left end part of an optical component and a holding member of an illumination device according to a second embodiment of the present disclosure.
Figure 20:
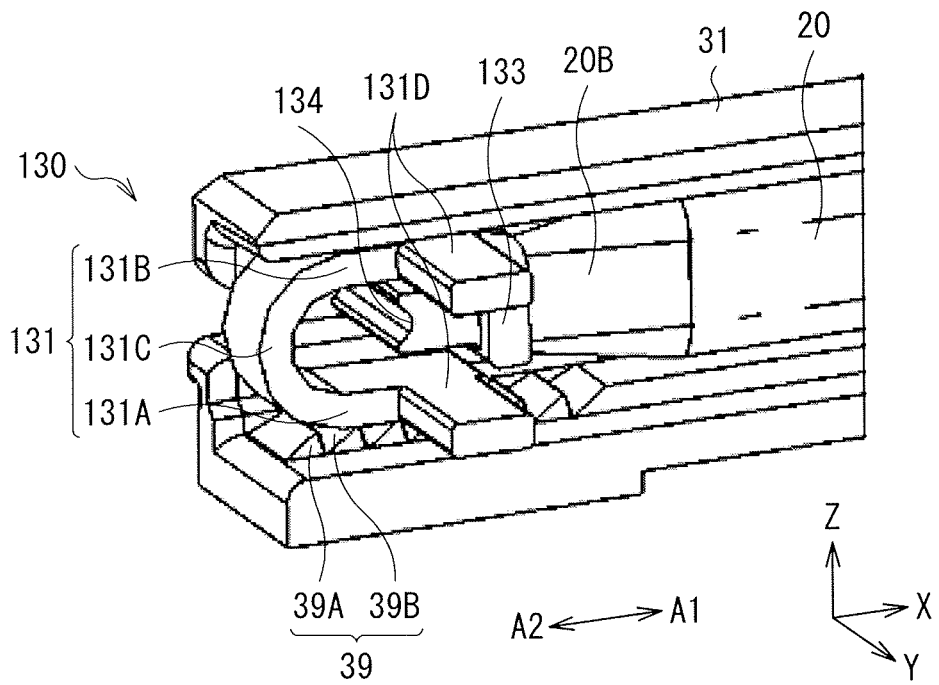
FIG. 20 is a perspective view illustrating a configuration of a stopper illustrated in FIG. 19 as viewed from a side close to a light guide plate.
Figure 21:
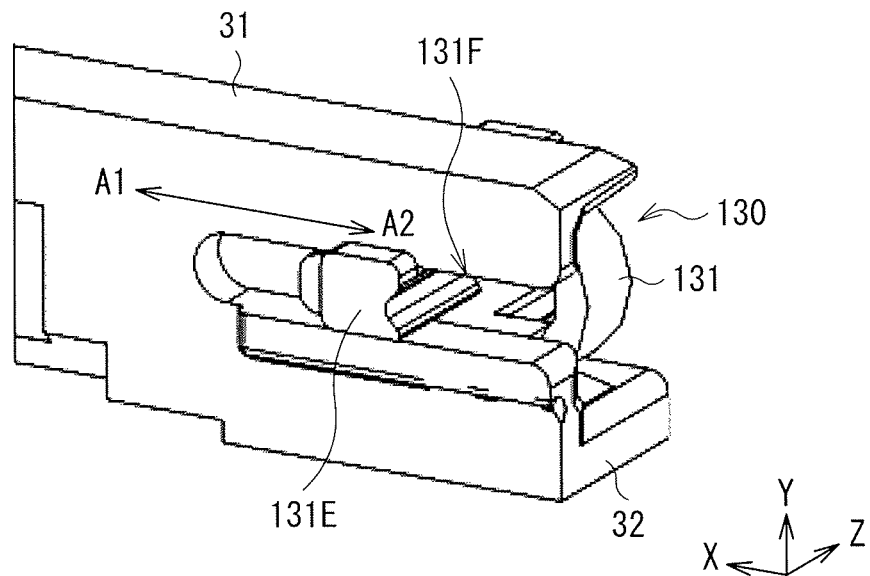
FIG. 21 is a perspective view illustrating a configuration of the stopper illustrated in FIG. 19 as viewed from a side close to a light source.

FIG. 19 to FIG. 21 each illustrate the left end part 1E of the optical component 20 and the holding member 30 of the illumination device 1 according to a second embodiment of the present disclosure in an enlarged manner. In the second embodiment, a U-shaped stopper 130 is provided as the variable pressing member 100 in place of the torsion coil spring 110 and the cap 120. The stopper 130 is movable in stages in the first direction A1 (in a direction approaching the wall 36), and the movement of the stopper 130 in the second direction A2 (in a direction away from the wall 36) opposite to the first direction A1 is restrained.

For example, the stopper 130 may be integrally formed of a resin material or the like as a whole, and is capable of improving mass productivity as compared with the torsion coil spring 110. As the resin material, a resin having high sliding property, high flexibility, and high heat resistance, for example, a polycarbonate resin or a high heat resistance acrylonitrile butadiene styrene (ABS) resin may be preferable.

Specifically, the stopper 130 has a U-shaped body 131, a claw 132, and an extension part 133.

The U-shaped body 131 has a U-shape in which a first leg part 131A and a second leg part 131B are connected by a curving part 131C. A front end of each of the first leg part 131A and the second leg part 131B on a side close to the light guide plate 50 is provided with a knob 131D. A front end of the second 1e part 131B on a side close to the light sources 10 is provided with a locking part 131E. The locking part 131E is engaged with a guide groove 131F that is provided on a back surface of the holding member 30, and restricts a moving direction of the stopper 130 to the longitudinal direction (the X direction) of the optical component 20 as well as prevents the stopper 130 from dropping off.

Figure 22:
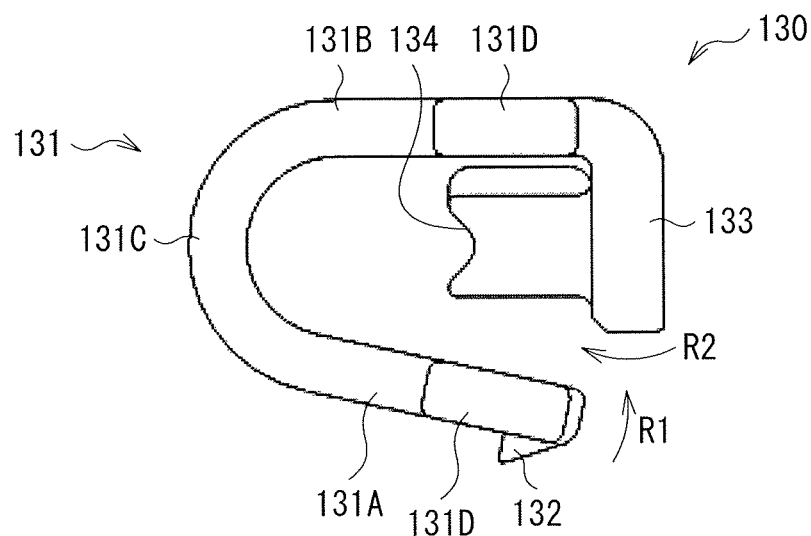
FIG. 22 is a front view illustrating the configuration of the stopper illustrated in FIG. 19.

As illustrated in FIG. 22, the U-shaped body 131 alone is in a state where the first leg part 131A is opened outward, and has elasticity. Thus, the first leg part 131A has a hinge structure pivotable about the curving part 131C in a direction approaching the second leg part 131B (in a closing direction, an arrow R1 in FIG. 22).

The claw 132 is provided outside the first leg part 131A, and has a cross section of a right triangle formed of a perpendicular plane and an inclined plane inclined downward (becoming gradually lower) from a front end of the perpendicular plane along the first direction A1. In addition, the inclined plane of the claw 132 becomes high toward the curving part 131C. The claw 132 has a function corresponding to the claw 122 of the cap 120 in the first embodiment.

Specifically, as with the first embodiment, the sawtooth section 39 is provided on the bottom surface section 32 of the holding member 30. The sawtooth section 39 has a latch structure in which the plurality of grooves 39B is arranged in the first direction with the ridges 39A in between. Each of the ridges 39A has a cross section of a right triangle formed of a perpendicular plane and an inclined plane inclined upward (becoming gradually higher) along the first direction A1. The perpendicular plane of the claw 132 is locked with the perpendicular plane of the ridge 39A by engagement of the claw 132 and the groove 39B so that the stopper 130 is regulated in position, and the claw 132 climbs over the ridge 39A and engages with the groove 39B adjacent to the ridge 39A so that the stopper 130 is movable in the first direction A1.

The extension part 133 extends from the front end of the second leg part 131B, has a clearance with the front end of the first leg part 131A, and has elasticity. Therefore, the extension part 133 has a hinge structure pivotable about the front end of the second leg part 131B toward the curving part 131C (an arrow R2 in FIG. 22). Incidentally, a projection having a groove 134 is provided inside the extension part 133. The groove 134 will be described in a third embodiment.

Figure 23:
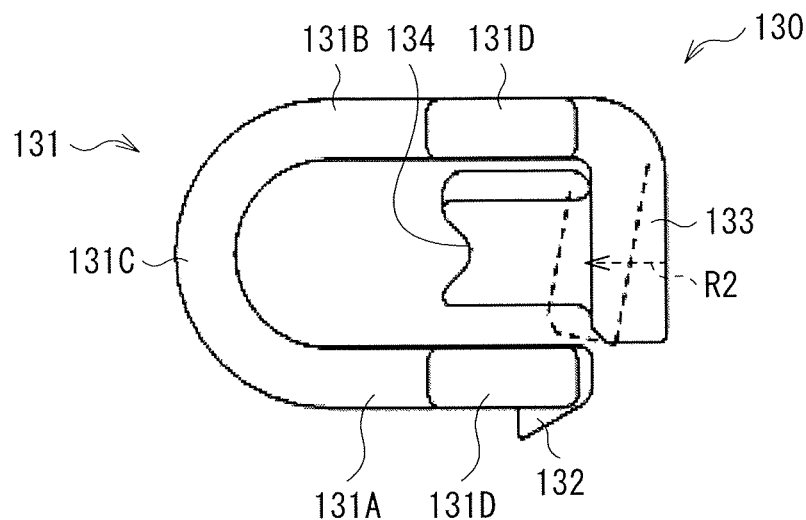
FIG. 23 is a front view for describing operation of the stopper illustrated in FIG. 19.

The second end 20B in the longitudinal direction of the optical component 20 is in contact with the extension part 133. As illustrated in FIG. 23, when the extension part 133 is pressed in the second direction A2 by the second end 20B in the longitudinal direction of the optical component 20, the extension part 133 pivots in the arrow R2 direction to come into between the first leg part 131A and the second leg part 131B of the U-shaped body 131, which restrains the claw 132 from climbing over the ridge 39A to engage with the groove 39B adjacent to the ridge 39A. This restricts movement of the stopper 130 in the second direction A2.

Figure 24:
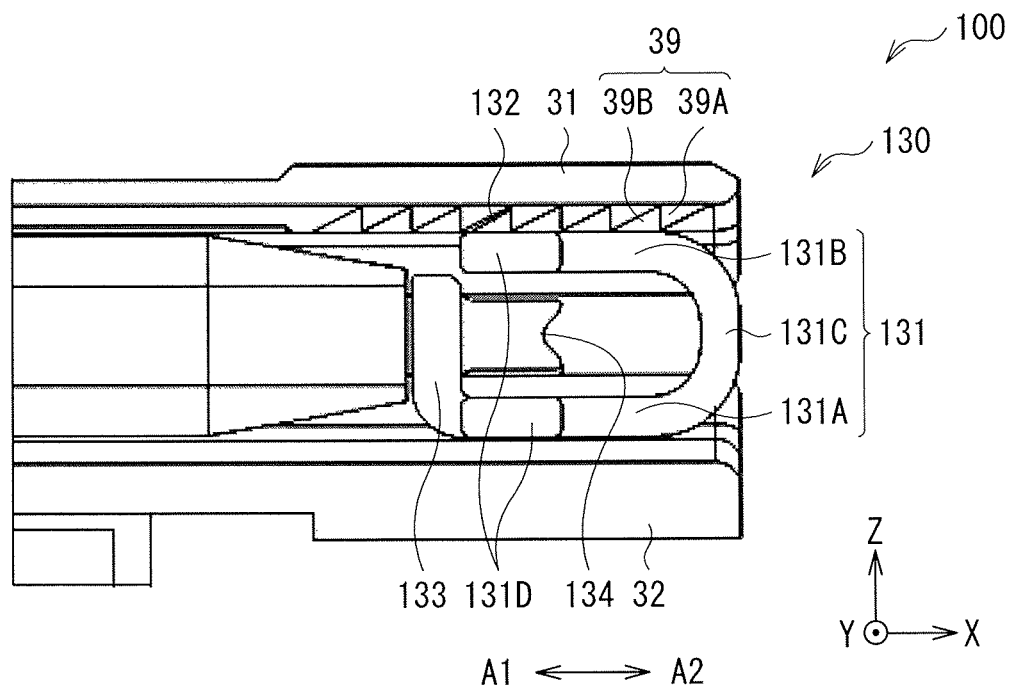
FIG. 24 is an enlarged front view illustrating a state where the stopper illustrated in FIG. 19 is attached to a right end part of the optical component and the holding member.

As with the first embodiment, the above-described configuration is symmetrical about the wall 36 in the lateral direction (the X direction). In other words, as illustrated in FIG. 24, the variable pressing member 100 configured of the stopper 130 is provided at the second end 20B of the optical component 20 on the opposite right end part 1D. Accordingly, the two optical components 20 are constantly pressed against the center wall 36, which suppresses that the brightness and the like at the boundary between the two optical components 20 are different from those of its surroundings.

In addition, as illustrated in FIG. 24, the sawtooth section 39 is provided on the top surface section 31 of the holding member 30 on the right end part 1D. Therefore, the stopper 130 illustrated in FIG. 19 is allowed to be vertically inverted and attached to the right end part 1D, and thus the stopper 130 having the same shape is allowed to be used on both of the left end part 1E and the right end part 1D.

In the illumination device 1, in FIG. 19, when the stopper 130 is inserted in the first direction A1 (in the right direction in FIG. 19), the claw 132 is locked with the ridge 39A for every cycle P5 of the sawtooth section 39, and thus the stopper 130 does not move in the second direction A2. When the stopper 130 comes in the first direction A1, and the claw 132 is engaged with the groove 39B at the position where the extension part 133 is in contact with the second end 20B in the longitudinal direction of the optical component 20, the stopper 130 stops at that position, and displacement thereof in the second direction A2 is restrained. Therefore, it is possible to absorb variation in length of the optical component 20.

When the stopper 130 is removed, the knob 131D is grasped to release the claw 132 from the sawtooth section 39, and then the stopper 130 is removed.

Moreover, in the case where the optical component 20 receives force in the longitudinal direction (the X direction) by impact or the like, as illustrated in FIG. 23, the extension part 133 pivots in the arrow R2 direction to be bent and absorbs the impact. In addition, the extension part 133 comes into between the first leg part 131A and the second leg part 131B of the U-shaped body 131, and thus the second leg part 131B is floated to restrict the claw 132 not to climb over the ridge 39A and not to engage with the groove 39B adjacent to the ridge 39A. This suppresses movement of the stopper 130 in the second direction A2 and dropping out thereof from the sawtooth section 39.

As described above, in the second embodiment, as the variable pressing member 100, the stopper 130 that is movable in stages in the first direction A1 and is restrained in movement in the second direction A2 is provided. Therefore, as with the first embodiment, the optical component 20 is allowed to be held with high positional accuracy in the holding member 30, the property of the optical component 20 is allowed to be favorably exerted, and more favorable color developing characteristics are allowed to be obtained without limitation by the characteristics of the light sources 10.

Third Embodiment

Figure 25:
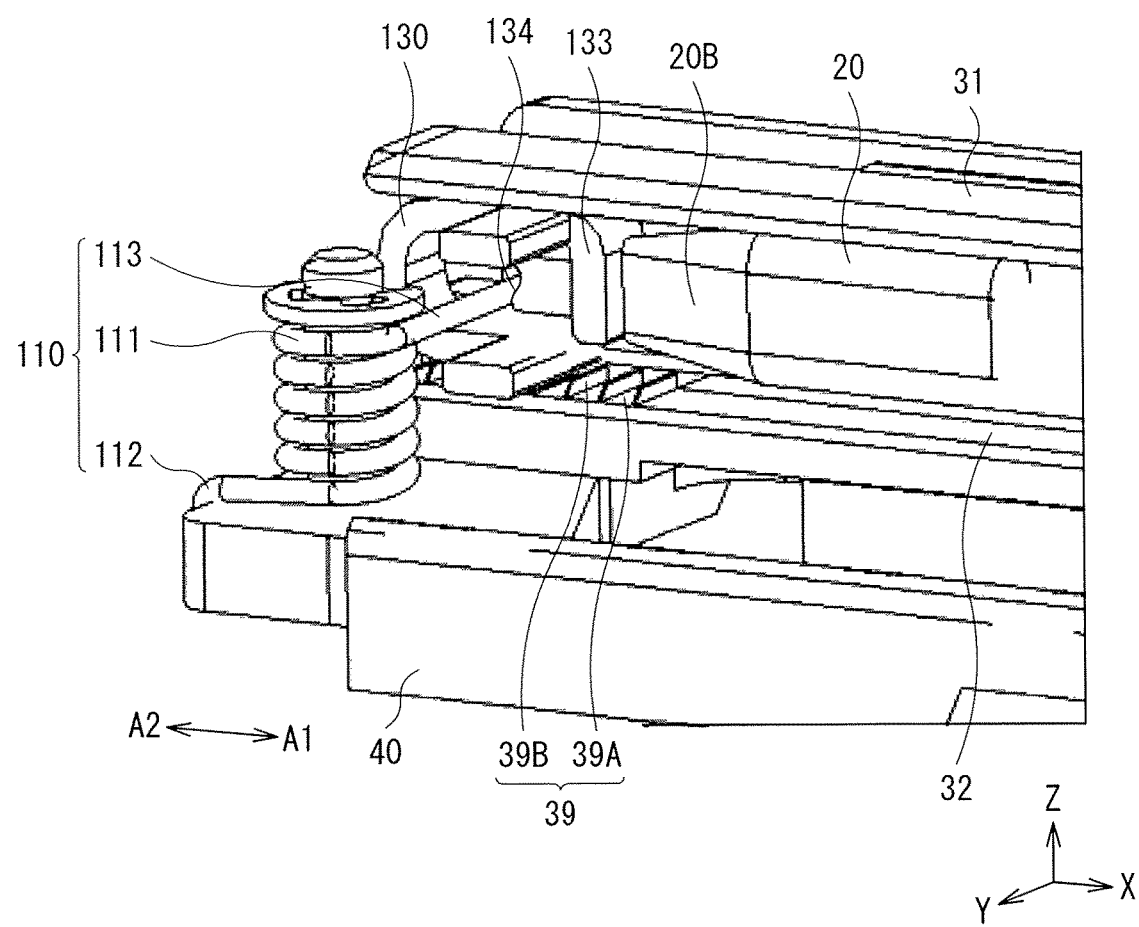
FIG. 25 is an enlarged perspective view illustrating a left end part of an optical component and a holding member of an illumination device according to a third embodiment of the present disclosure.
Figure 26:
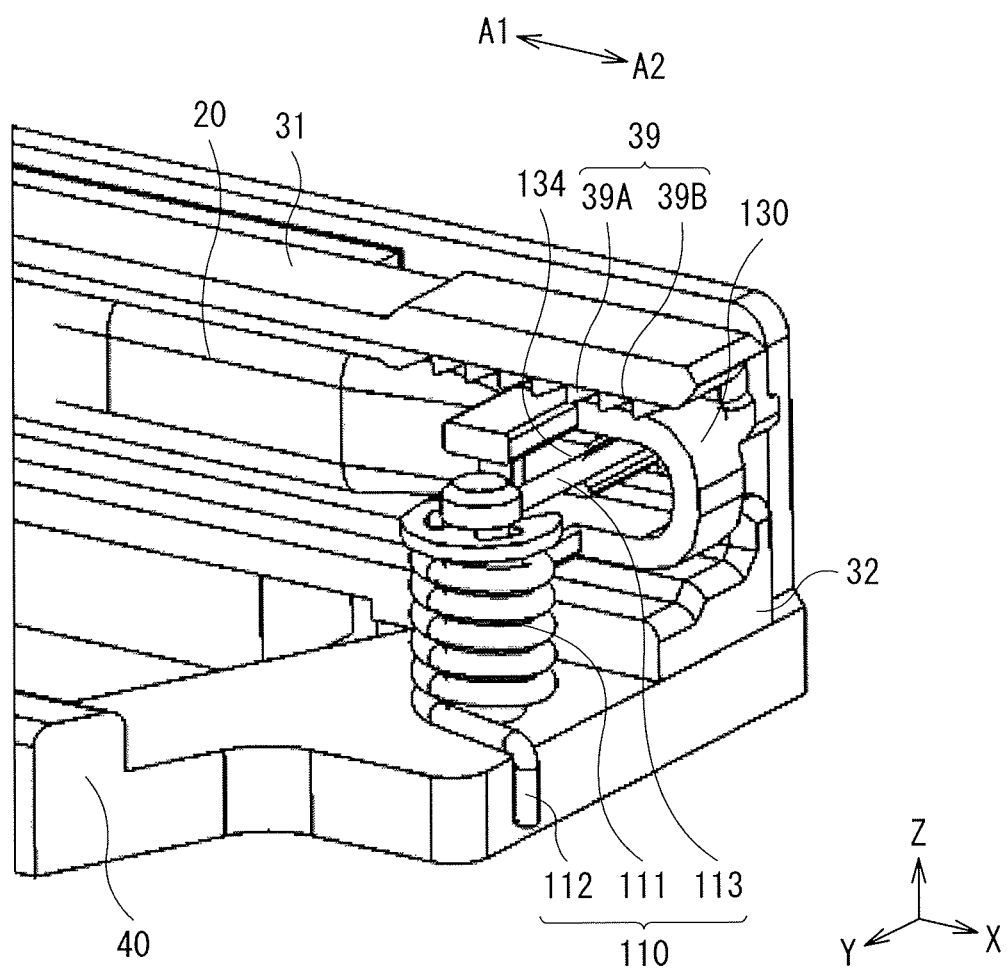
FIG. 26 is an enlarged perspective view illustrating a right end part of the optical component and the holding member illustrated in FIG. 25.

FIG. 25 and FIG. 26 illustrate the left end part 1E and the right end part 1D, respectively, of the optical component 20 and the holding member 30 in the illumination device 1 according to a third embodiment of the present disclosure in an enlarged manner. The third embodiment is combination of the first embodiment and the second embodiment. Specifically, the second arm 113 of the torsion coil spring 110 is locked with the groove 134 inside the extension part 133 of the stopper 130. The second arm 113 pressurizes the optical component 20 in the first direction A1 through the stopper 130.

In the third embodiment, the variation and the fluctuation of the dimensions of the optical component 20 are smaller than the pitch P5 of the sawtooth section 39, and when allowance occurs between the optical component 20 and the stopper 130, the allowance is absorbed by fine adjustment by the torsion coil spring in the first embodiment to suppress backlash of the optical component 20.

Fourth Embodiment

Figure 27:
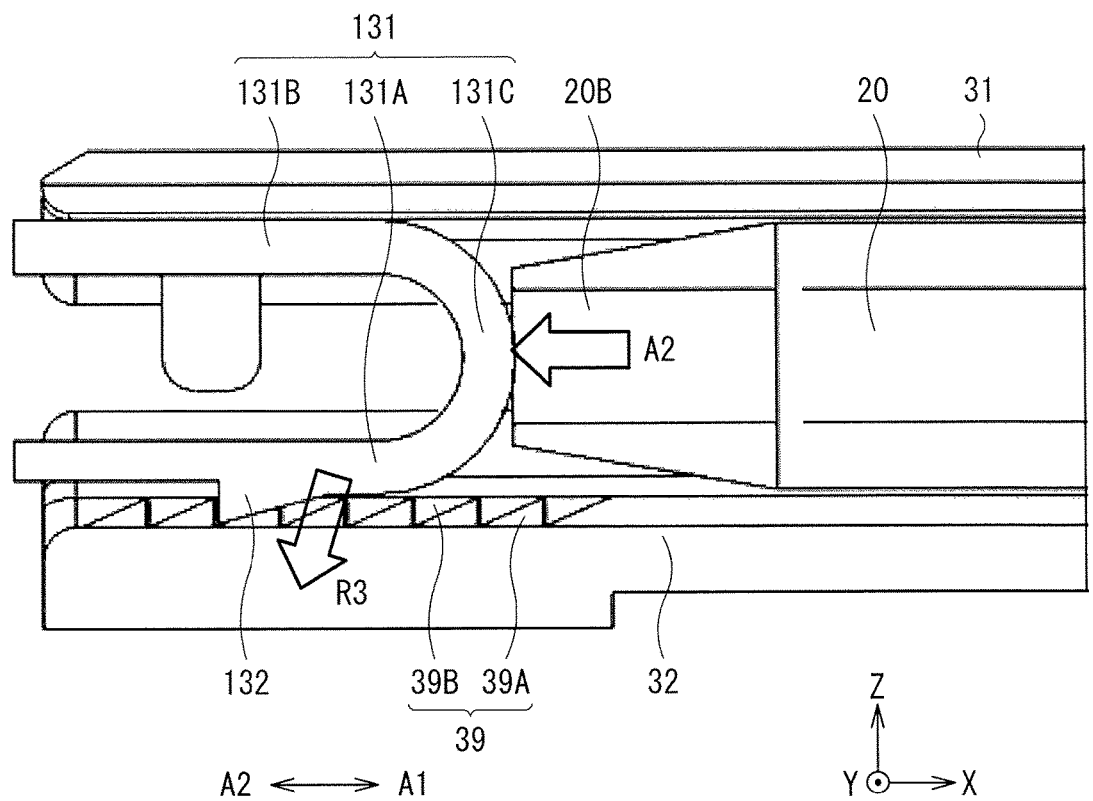
FIG. 27 is an enlarged front view illustrating a left end part of an optical component and a holding member of an illumination device according to a fourth embodiment of the present disclosure.

FIG. 27 illustrates the left end part 1E of the optical component 20 and the holding member 30 in the illumination device 1 according to a fourth embodiment of the present disclosure in an enlarged manner. In the fourth embodiment, the claw 132 of the U-shaped stopper 130 described in the second embodiment is inversely provided to allow the stopper 130 to be attachable in a reverse direction from that of the second embodiment. As with the second embodiment, the stopper 130 is movable in stages in the first direction A1 (in the direction approaching the wall 36), and the movement of the stopper 130 in the second direction A2 (in the direction away from the wall 36) opposite to the first direction A1 is restrained.

Figure 28:
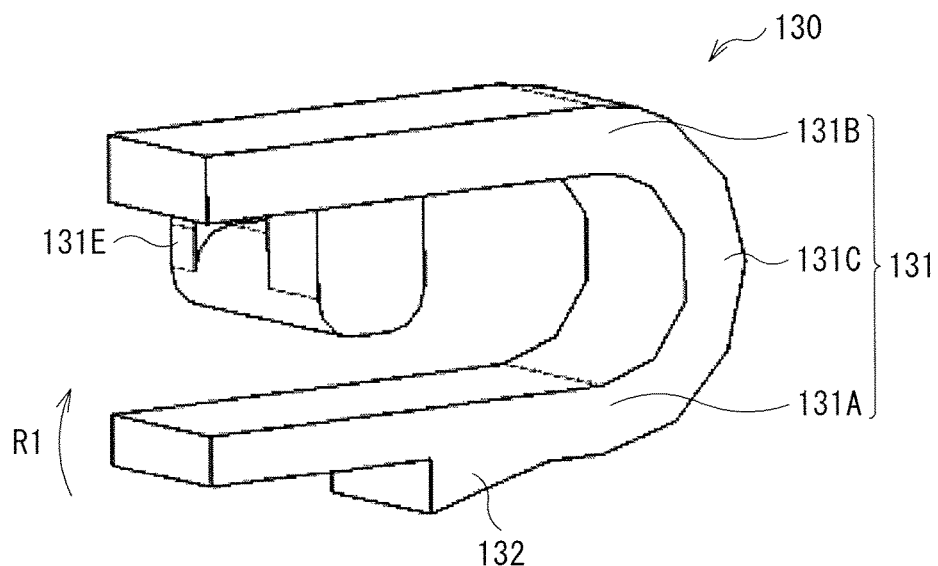
FIG. 28 is a perspective view illustrating a configuration of a stopper illustrated in FIG. 27.

FIG. 28 illustrates the configuration of the stopper 130 illustrated in FIG. 27. The stopper 130 has the U-shaped body 131 and the claw 132. The resin material of the stopper 130 is similar to that in the second embodiment.

The U-shaped body 131 has a U-shape in which the first leg part 131A and the second leg part 131B are connected by the curving part 131C. The front end of each of the first leg part 131A and the second leg part 131B on a side close to the light guide plate 50 is provided with the knob 131D (omitted in FIG. 27 and FIG. 28). The front end of the second leg part 131B on a side close to the light sources 10 is provided with the locking part 131E.

Although not illustrated, as with the second embodiment, the U-shaped body 131 alone is in a state where the first leg part 131A is opened outward, and has elasticity. Thus, the first leg part 131A has a hinge structure pivotable about the curving part 131C in the direction approaching the second leg part 131B (in the closing direction, an arrow R1 in FIG. 28).

The claw 132 is provided outside the first leg part 131A, and has a cross section of a right triangle formed of a perpendicular plane and an inclined plane inclined downward (becoming gradually lower) from a front end of the perpendicular plane along the first direction A1. In the fourth embodiment, the inclined plane of the claw 132 is provided opposite to that in the second embodiment, and becomes lower toward the curving part 131C.

As with the second embodiment, the sawtooth section 39 is provided on the bottom surface section 32 of the holding member 30. The sawtooth section 39 has a latch structure in which the plurality of grooves 39B is arranged in the first direction A1 with the ridges 39A in between. Each of the ridges 39A has a cross section of a right triangle formed of a perpendicular plane and an inclined plane inclined upward (becoming gradually higher) along the first direction A1. The perpendicular plane of the claw 132 is locked with the perpendicular plane of the ridge 39A by engagement of the claw 132 and the groove 39B so that the stopper 130 is regulated in position, and the claw 132 climbs over the ridge 39A and engages with the groove 39B adjacent to the ridge 39A so that the stopper 130 is movable in the first direction A1.

The second end 20B in the longitudinal direction of the optical component 20 is in contact with the curving part 131C. As illustrated in FIG. 27, when the curving part 131C is pressed in the second direction A2 by the second end 20B in the longitudinal direction of the optical component 20, the second leg part 131B intends to open outward in an arrow R3 direction, and the claw 132 further locks with the groove 39B, which makes the claw 132 difficult to be released. Therefore, this restrains the claw 132 from climbing over the ridge 39A and engages the groove 39B adjacent to the ridge 39A, which restrains the movement of the stopper 130 in the second direction A2.

As described above, in the fourth embodiment, as the variable pressing member 100, the stopper 130 that is provided with inverted claw 132 and is attachable in a reverse direction from the second embodiment is used. Therefore, as with the first embodiment, the optical component 20 is allowed to be held in the holding member 30 with high positional accuracy, the property of the optical component 20 is allowed to be favorably exerted, and more favorable color developing characteristics are allowed to be obtained without limitation by the characteristics of the light sources 10.

Fifth Embodiment

Figure 29:
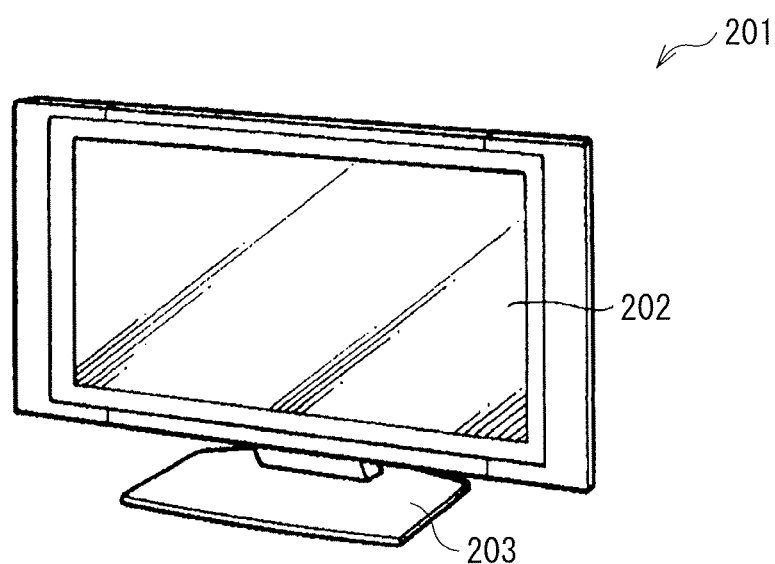
FIG. 29 is a perspective view illustrating an appearance of a display unit according to a fifth embodiment of the present disclosure.

FIG. 29 illustrates an appearance of a display unit 201 according to a fifth embodiment of the present disclosure. The display unit 201 may be used as a flat-screen television, for example, and may have a configuration in which a plate-like main body section 202 for image display is supported by a stand 203. Note that the display unit 201 is used as a stationary display unit in a state where the stand 203 is attached to the main body section 202 and is placed on a flat surface such as a floor, a shelf, and a table. However, the display unit 201 may be used as a wall-hanging display unit in a state where the stand 203 is detached from the main body section 202.

Figure 30:
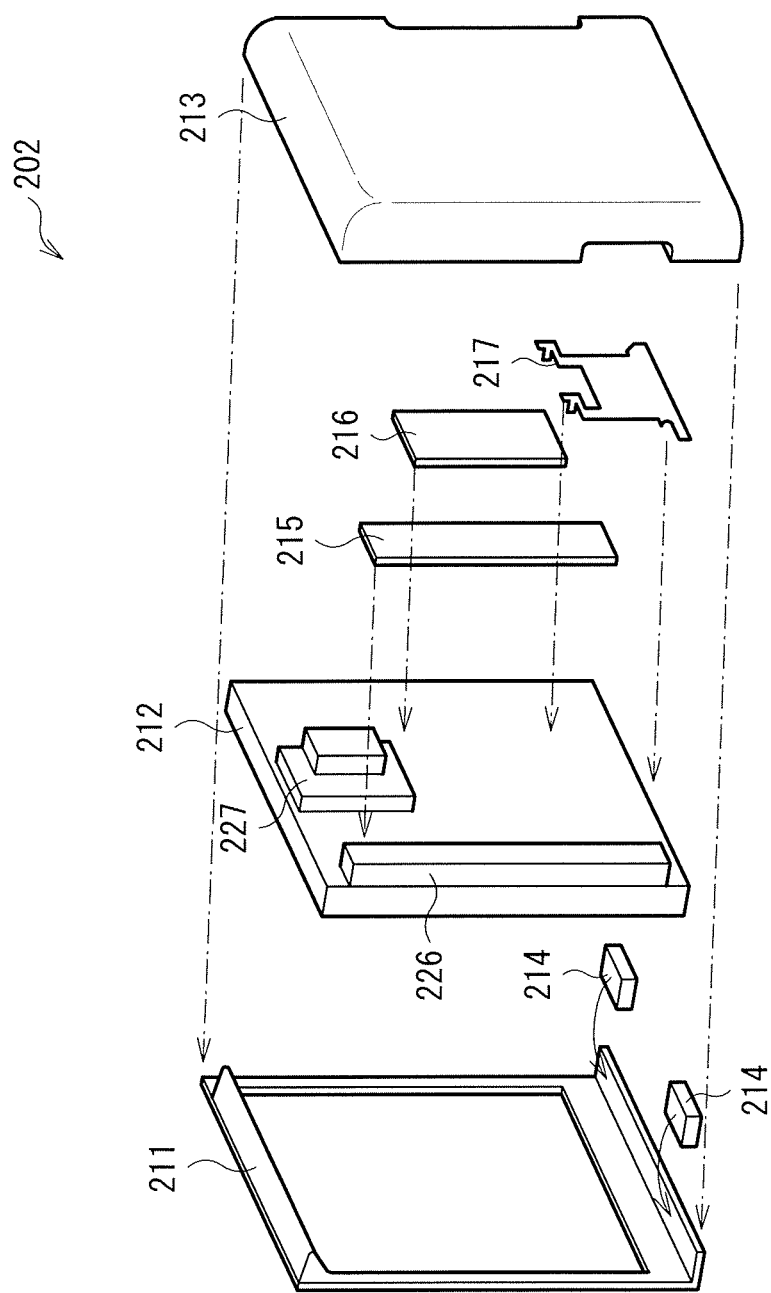
FIG. 30 is an exploded perspective view illustrating a main body section illustrated in FIG. 29.

FIG. 30 illustrates the main body section 202 illustrated in FIG. 29 in an exploded manner. For example, the main body section 202 may include a front bezel 211, a panel module 212, and rear cover 213 in this order from a front surface side (a viewer side). The front bezel 211 is a frame member covering a front periphery of the panel module 212, and a pair of speakers 214 is provided at a lower part of the front bezel 211. The panel module 212 is fixed to the front bezel 211, and a power source substrate 215 and a signal substrate 216 are mounted on a back surface of the panel module 212 and an attachment bracket 217 is fixed thereto. The attachment bracket 217 is to attach a wall-hanging bracket, to attach substrates and the like, and to attach the stand 203. The rear cover 213 covers the back surface and side surfaces of the panel module 212.

Figure 31:
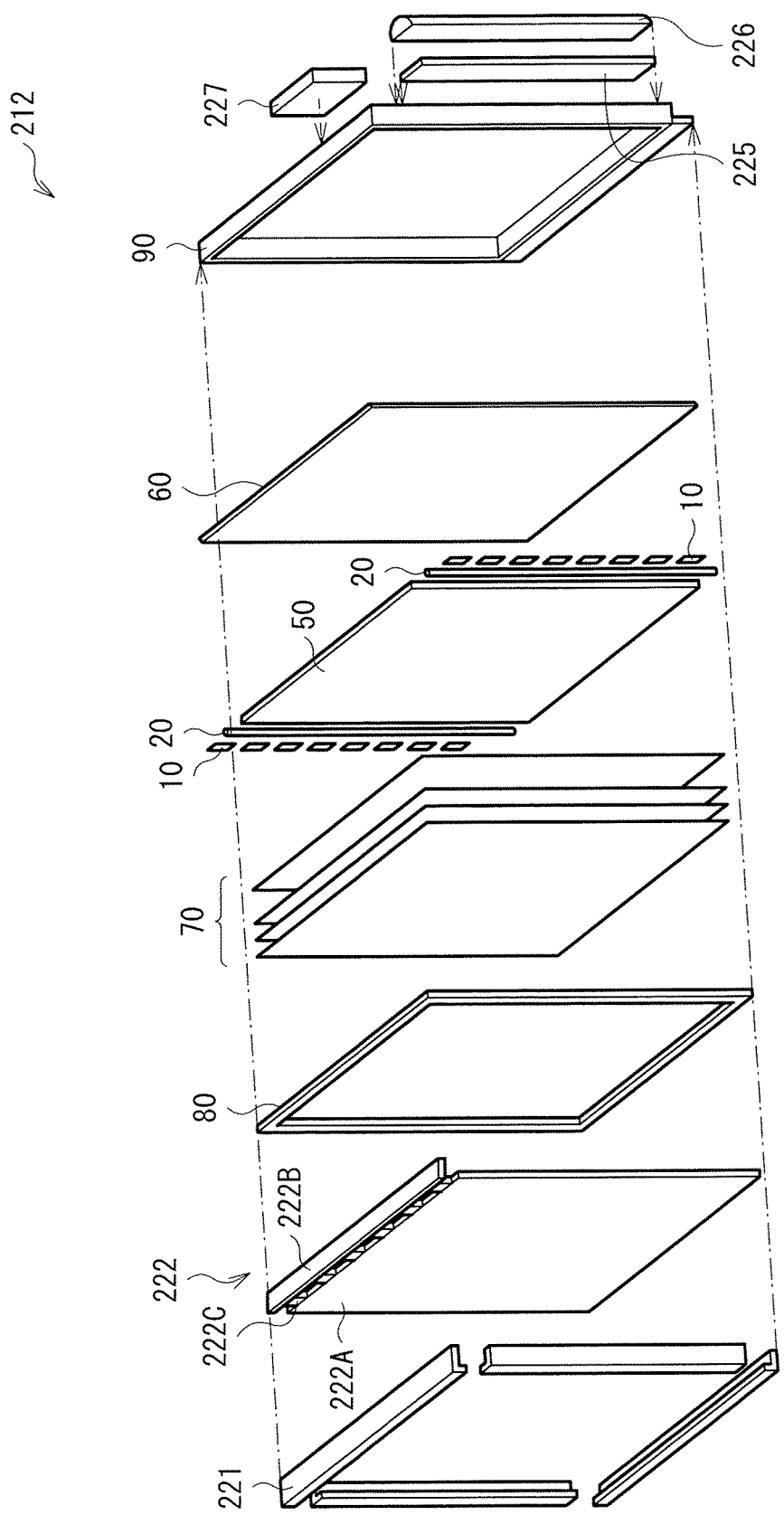
FIG. 31 is an exploded perspective view illustrating a panel module illustrated in FIG. 30.

FIG. 31 illustrates the panel module 212 illustrated in FIG. 30 in an exploded manner. For example, the panel module 212 may include a top chassis 221, a liquid crystal panel 222, the middle chassis 80, the optical sheet 70, the light guide plate 50, the reflective member 60, the back chassis 90, a balancer substrate 225, a balancer cover 226, and a timing controller substrate 227 in this order from the front surface side (the viewer side).

The top chassis 221 is a frame-like meal component covering the front periphery of the liquid crystal panel 222. For example, the liquid crystal panel 222 may include a liquid crystal cell 222A, a source substrate 222B, and a flexible substrate 22C such as chip on film (COF). The flexible substrate 22C connects the liquid crystal cell 222A with the source substrate 222B. The middle chassis 80 is a frame-like resin component holding the liquid crystal panel 222 and the optical sheet 70. The back chassis 90 is a metal component that houses the liquid crystal panel 222 and the illumination device 1 and is formed of iron (Fe) or the like. The balancer substrate 225 controls the illumination device 1, and is mounted on the back surface of the back chassis 90 as well as is covered with the balancer cover 226 as illustrated in FIG. 31. The timing controller substrate 227 is also mounted on the back surface of the back chassis 90.

In the display unit 201, light from the illumination device 1 is allowed to selectively pass though the liquid crystal panel 222, and thus image display is performed. In this case, as described in the first embodiment, since the illumination device 1 with improved color developing characteristics is provided, display quality of the display unit 201 is improved.

Note that, in the above-described fifth embodiment, the case where the display unit 201 includes the illumination device 1 according to the first embodiment has been described. However, it is needless to say that the display unit 201 may include the illumination device 1 according to any of the second to fourth embodiments, in place of the illumination device 1 according to the first embodiment.

Application Examples of Illumination Device

Figure 32:
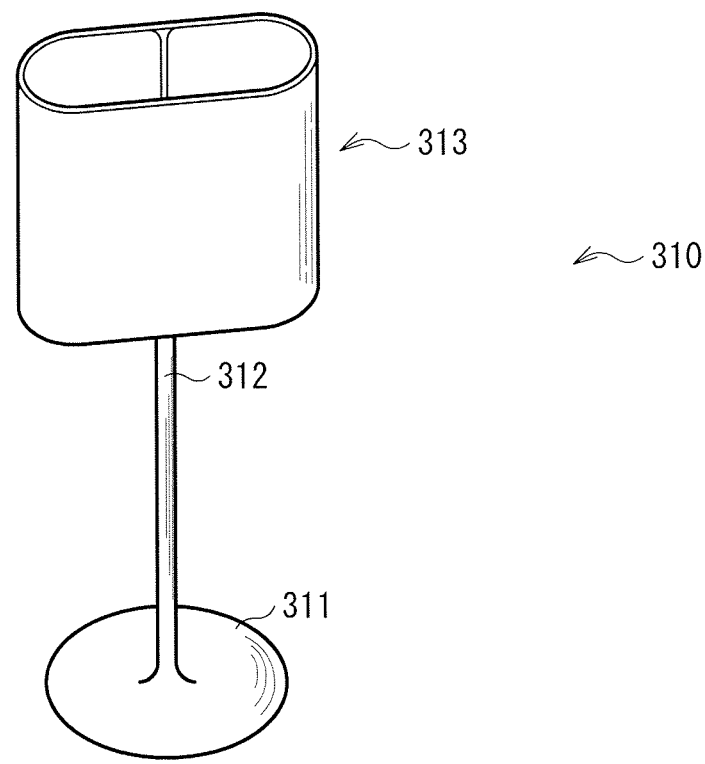
FIG. 32 is a perspective view illustrating an appearance of an application example 1 of the illumination device.
Figure 33:
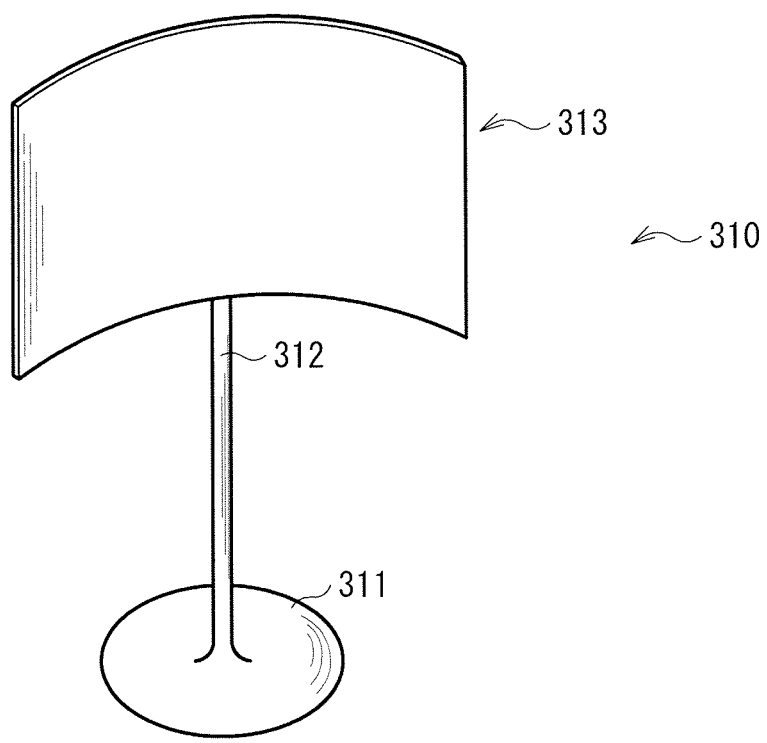
FIG. 33 is a perspective view illustrating an appearance of an application example 2 of the illumination device.

FIG. 32 and FIG. 33 each illustrate an appearance of a tabletop illumination apparatus 310 to which the illumination device 1 according to any of the above-described embodiments is applied. For example, the illumination apparatus 310 may be configured by attaching an illumination section 313 to a supporting post 312 provided on a base 311. The illumination section 313 is configured of the illumination device 1 according to any of the above-described embodiments. The illumination section 313 may have an arbitral shape such as a tubular shape illustrated in FIG. 32, a curved surface shape illustrated in FIG. 33, or the like by forming the light guide plate 50 in a curved shape.

Figure 34:
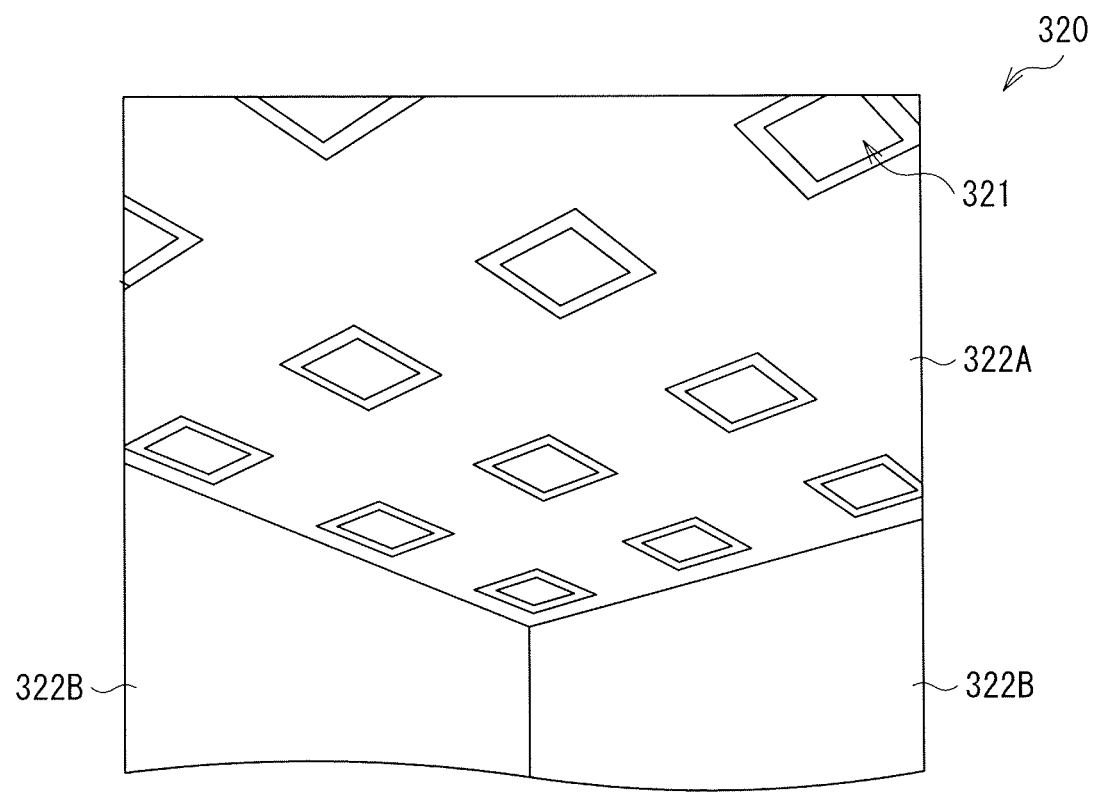
FIG. 34 is a perspective view illustrating an appearance of an application example 3 of the illumination device.

FIG. 34 illustrates an appearance of a room illumination apparatus 320 to which the illumination device 1 according to any of the above-described embodiments is applied. The illumination apparatus 320 may include, for example, illumination sections 321 each configured of the illumination device 1 according to any of the above-described embodiments. The appropriate number of illumination sections 321 are arranged with appropriate distances on a ceiling 322A of a building. Note that the illumination sections 321 may be disposed on an arbitrary place such as walls 322B or a floor (not illustrated) without limitation on the ceiling 322A, depending on the purpose.

In the illumination apparatuses 310 and 320, illumination is performed by the light from the illumination device 1. In this example, as described in the above-described embodiments, since the illumination apparatuses 310 and 320 each include the illumination device 1 having favorable color developing characteristics, illumination quality is improved.

Hereinbefore, although the present disclosure has been described with referring to the embodiments, the present disclosure is not limited to the above-described embodiments, and various modifications may be made. For example, in the above-described embodiments, the case where the optical component 20 includes the two optical components 20, and the two optical components 20 are pressed against the center wall 36 by the variable pressing members 100 has been described. However, the present disclosure is applicable to a case where only one optical component 20 is provided. In such a case, for example, the first end 20A in the longitudinal direction of the optical component 20 is pressed against the wall 36, and the second end 20B in the longitudinal direction is provided with the variable pressing member 100 to absorb variation and fluctuation of the dimensions. Consequently, the optical component 20 is allowed to be pressed against the wall 36 with high accuracy in a small space, which is effective to downsizing of the illumination device 1.

In addition, for example, in the above-described embodiments, the case where each of the light sources 10 is an LED has been described. However, each of the light sources 10 may be configured of a semiconductor laser or the like.

Further, for example, although the specific configurations of the illumination device 1 and the display unit 201 (the television) has been described in the above-described embodiments, all of the components are not necessarily provided, and other components may be further provided.

Moreover, for example, the materials and the thicknesses of the respective components described in the above-described embodiments are not limited, and other materials and other thicknesses may be used.

The present disclosure is applicable to other display units such as a monitor, in addition to the television described in the above-described embodiment.

Note that the present technology may be configured as follows.

(1) An illumination device including:
a light source;
an optical component provided separately from the light source;
a holding member holding the light source and the optical component; and
a variable pressing member variably pressing the optical component against the holding member.

(2) The illumination device according to (1), wherein the variable pressing member is a stopper that is movable in stages in a first direction, and is restrained in movement in a second direction, the second direction being opposite to the first direction.

(3) The illumination device according to (2), wherein the stopper includes a U-shaped body and a claw, the U-shaped body including a first leg part, a second leg part, and a curving part coupling the first leg part and the second leg part, and the claw being provided outside the first leg part.

(4) The illumination device according to (3), wherein the holding member has a sawtooth section in which a plurality of grooves is arranged in the first direction with ridges in between, and
the stopper is regulated in position by engagement of the claw and the groove, and the claw climbs over the ridge and engages with the groove adjacent to the ridge to allow the stopper to be movable in the first direction.

(5) The illumination device according to (4), wherein the stopper has an extension part extending from a front end of the second leg part, the extension part having a clearance with a front end of the first leg part,
a first end of the optical component is in contact with the extension part, and
when the extension part is pressed in the second direction by the first end of the optical component, the extension part comes into between the first leg part and the second leg part of the U-shaped body to restrain the claw from climbing over the ridge.

(6) The illumination device according to (4), wherein a first end of the optical component is in contact with the curving part, and
when the curving part is pressed in the second direction by the first end of the optical component, the first leg part and the second leg part of the U-shaped body are opened outward to restrain the claw from climbing over the ridge.

(7) The illumination device according to (1), wherein the variable pressing member is an elastic component capable of pressing the optical component in a first direction in the holding member.

(8) The illumination device according to (7), wherein the elastic component is formed of one or more of a metal spring, a resin, a foamed body, and elastomer.

(9) The illumination device according to (8), wherein the elastic component is configured of a torsion coil spring.

(10) The illumination device according to (8), wherein the elastic component is configured of a metal spring and a non-metal optical component cover provided between the metal spring and the optical component.

(11) The illumination device according to (10), wherein the holding member has a sawtooth section in which a plurality of grooves is arranged in the first direction with ridges in between, and
the optical component cover has a claw outside thereof, is regulated in position by engagement of the claw and the groove, and when the claw climbs over the ridge to engage the groove adjacent to the ridge, the optical component cover is movable in the first direction.

(12) The illumination device according to any one of (1) to (11), wherein the optical component is a wavelength conversion member configured by sealing a wavelength conversion material in a tubular container.

(13) The illumination device according to (12), wherein
the optical component includes a plurality of optical components,
the plurality of optical components is arranged in line with one another,
the holding member has a wall at a boundary between the adjacent two optical components, the wall receiving a second end in the longitudinal direction of each of the optical components, and
the variable pressing member is provided on a first end of the longitudinal direction of the respective optical components.

(14) The illumination device according to (12) or (13), wherein
the wavelength conversion material contains a quantum dot.

(15) The illumination device according to (14), wherein
the light source is a blue light source, and
the wavelength conversion material converts a wavelength of blue light into a wavelength of red light or green light.

(16) The illumination device according to any one of (1) to (15), wherein the light source is a light emitting diode (LED).

(17) The illumination device according to any one of (1) to (16), wherein the holding member is divided into a plurality of divided holding members in a longitudinal direction of the optical component.

(18) A display unit provided with a liquid crystal panel and an illumination device provided on a back surface side of the liquid crystal panel, the illumination device including:
a light source;
an optical component provided separately from the light source;
a holding member holding the light source and the optical component; and
a variable pressing member variably pressing the optical component against the holding member.

It should be understood by those skilled in the art that various modifications, combinations, sub-combinations, and alterations may occur depending on design requirements and other factors insofar as they are within the scope of the appended claims or the equivalents thereof.

What is claimed is:

1. A illumination device comprising:
   a light source;
   an optical component provided separately from the light source;
   a holding member holding the light source and the optical component, wherein the holding member is divided into a plurality of divided holding members in a longitudinal direction of the optical component, adjacent ones of the plurality of divided holding members having end portions facing one another to define dividing parts and being joined at the dividing parts, each of the end portions having a projection and a step part by which the adjacent ones of the plurality of divided holding members are coupled with each other; and
   a variable pressing member variably pressing the optical component against the holding member.

2. The illumination device according to claim 1, wherein the variable pressing member is a stopper that is movable in stages in a first direction, and is restrained in movement in a second direction, the second direction being opposite to the first direction.

3. The illumination device according to claim 2, wherein the stopper includes a U-shaped body and a claw, the U-shaped body including a first leg part, a second leg part, and a curving part coupling the first leg part and the second leg part, and the claw being provided outside the first leg part.

4. The illumination device according to claim 3, wherein
   the holding member has a sawtooth section in which a plurality of grooves is arranged in the first direction with ridges in between, and
   the stopper is regulated in position by engagement of the claw and the groove, and the claw climbs over the ridge and engages with the groove adjacent to the ridge to allow the stopper to be movable in the first direction.

5. The illumination device according to claim 4, wherein
   the stopper has an extension part extending from a front end of the second leg part, the extension part having a clearance with a front end of the first leg part,
   a first end of the optical component is in contact with the extension part, and
   when the extension part is pressed in the second direction by the first end of the optical component, the extension part comes into between the first leg part and the second leg part of the U-shaped body to restrain the claw from climbing over the ridge.

6. The illumination device according to claim 4, wherein
   a first end of the optical component is in contact with the curving part, and
   when the curving part is pressed in the second direction by the first end of the optical component, the first leg part and the second leg part of the U-shaped body are opened outward to restrain the claw from climbing over the ridge.

7. The illumination device according to claim 1, wherein the variable pressing member is an elastic component capable of pressing the optical component in a first direction in the holding member.

8. The illumination device according to claim 7, wherein the elastic component is formed of one or more of a metal spring, a resin, a foamed body, and elastomer.

9. The illumination device according to claim 7, wherein the elastic component is configured of a torsion coil spring.

10. The illumination device according to claim 7, wherein the elastic component is configured of a metal spring and a non-metal optical component cover provided between the metal spring and the optical component.

11. The illumination device according to claim 10, wherein
    the holding member has a sawtooth section in which a plurality of grooves are arranged in the first direction with ridges in between, and
    the optical component cover has a claw outside thereof, is regulated in position by engagement of the claw and a groove from the plurality of grooves, and in case the claw climbs over a ridge of the ridges to engage the groove adjacent to the ridge, the optical component cover is movable in the first direction.

12. The illumination device according to claim 1, wherein the optical component is a wavelength conversion member configured by sealing a wavelength conversion material in a tubular container.

13. The illumination device according to claim 12, wherein the wavelength conversion material contains a quantum dot.

14. The illumination device according to claim 12, wherein
    the light source is a blue light source, and
    the wavelength conversion material converts a wavelength of blue light into a wavelength of red light or green light.

15. The illumination device according to claim 1, wherein
    the optical component includes a plurality of optical components,
    the plurality of optical components are arranged in line with one another,
    the holding member has a wall at a boundary between adjacent two optical components, the wall receiving a second end in the longitudinal direction of each of the optical components, and
    the variable pressing member is provided on a first end of the longitudinal direction of the respective optical components.

16. The illumination device according to claim 1, wherein the light source is a light emitting diode (LED).

17. A display unit provided with a liquid crystal panel and an illumination device provided on a back surface side of the liquid crystal panel, the illumination device comprising:
    a light source;
    an optical component provided separately from the light source;
    a holding member holding the light source and the optical component, wherein the holding member is divided into a plurality of divided holding members in a longitudinal direction of the optical component, adjacent ones of the plurality of divided holding members having end portions facing one another to define dividing parts and being joined at the dividing parts, each of the end portions having a projection and a step part by which the adjacent ones of the plurality of divided holding members are coupled with each other; and
    a variable pressing member variably pressing the optical component against the holding member.

* * * * *